(12) United States Patent
Hewitt

(10) Patent No.: US 11,794,591 B2
(45) Date of Patent: Oct. 24, 2023

(54) STATORLESS ELECTRICAL GENERATOR SYSTEM DRIVEN BY A FLOWING FLUID

(71) Applicant: Brian Hewitt, Westland, MI (US)

(72) Inventor: Brian Hewitt, Westland, MI (US)

(*) Notice: Subject to any disclaimer, the term of this patent is extended or adjusted under 35 U.S.C. 154(b) by 123 days.

(21) Appl. No.: 17/351,600

(22) Filed: Jun. 18, 2021

(65) Prior Publication Data

US 2021/0394623 A1    Dec. 23, 2021

Related U.S. Application Data

(60) Provisional application No. 63/041,503, filed on Jun. 19, 2020.

(51) Int. Cl.
| | | |
|---|---|---|
| *H02K 16/00* | (2006.01) | |
| *H02K 7/18* | (2006.01) | |
| *B60L 50/10* | (2019.01) | |

(52) U.S. Cl.
CPC ............ *B60L 50/10* (2019.02); *H02K 7/1823* (2013.01); *H02K 16/005* (2013.01)

(58) Field of Classification Search
CPC ..... B60L 50/10; H02K 7/1823; H02K 16/005
See application file for complete search history.

(56) References Cited

U.S. PATENT DOCUMENTS

| | | |
|---|---|---|
| 3,807,890 A | 4/1974 | Wright |
| 4,034,231 A | 7/1977 | Conn et al. |
| 4,960,363 A | 10/1990 | Bergstein |
| 7,402,021 B2 | 7/2008 | Henkenhaf |
| 2011/0210557 A1* | 9/2011 | Lakhani ................ F03B 17/063 |
| 2013/0180259 A1* | 7/2013 | Stapp ......................... F02C 1/10 |
| 2017/0037854 A1* | 2/2017 | Spicer ................... F04D 13/024 |

FOREIGN PATENT DOCUMENTS

JP    4629469 B2  *  2/2011

OTHER PUBLICATIONS

JP4629469B2_translate (Year: 2011).*

* cited by examiner

*Primary Examiner* — Tulsidas C Patel
*Assistant Examiner* — Mohammed Ahmed Qureshi
(74) *Attorney, Agent, or Firm* — Endurance Law Group PLC

(57) ABSTRACT

An electrical generator system is provided with a housing. A first rotor is on the housing for rotation relative to the housing in response to fluid flow through the first rotor. A second rotor is on the housing for rotation relative to the housing in response to fluid flow through the second rotor. A first armature is driven for rotation by the first rotor for rotation in a first rotary direction. A second armature is oriented coaxial with the first armature and driven for rotation by the second rotor for rotation in a second rotary direction that is opposite to the first rotary direction to generate electricity.

14 Claims, 34 Drawing Sheets

This car could be equipped with a redundant system. If one overheats the other could switch on.

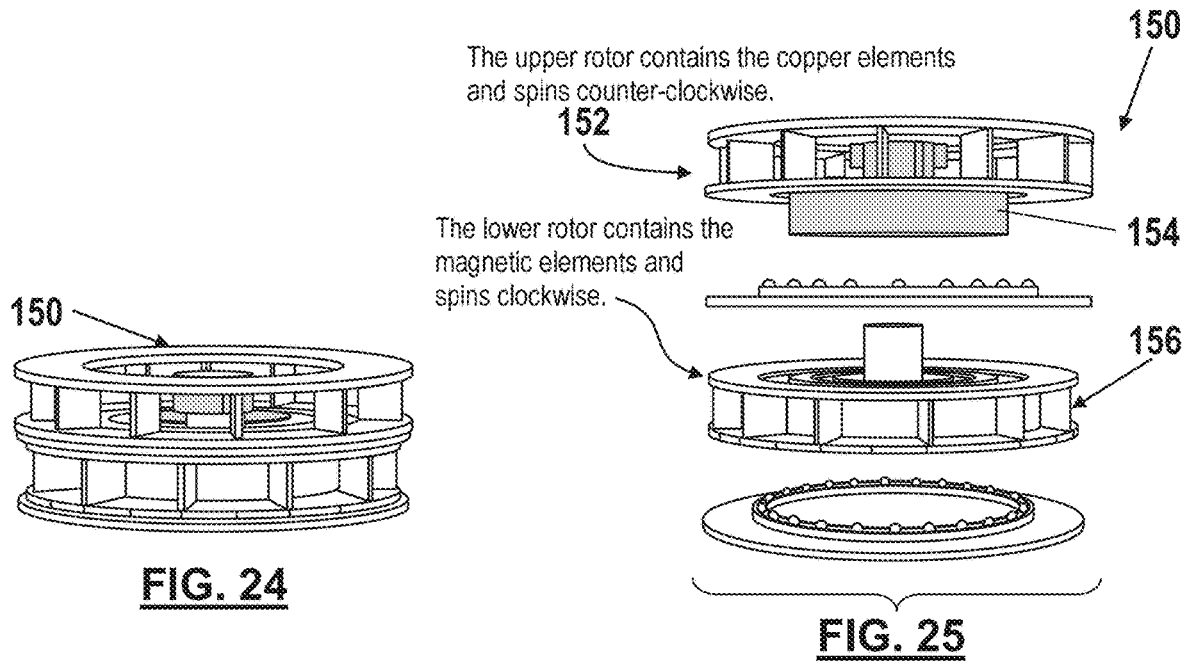
FIG. 24
FIG. 25
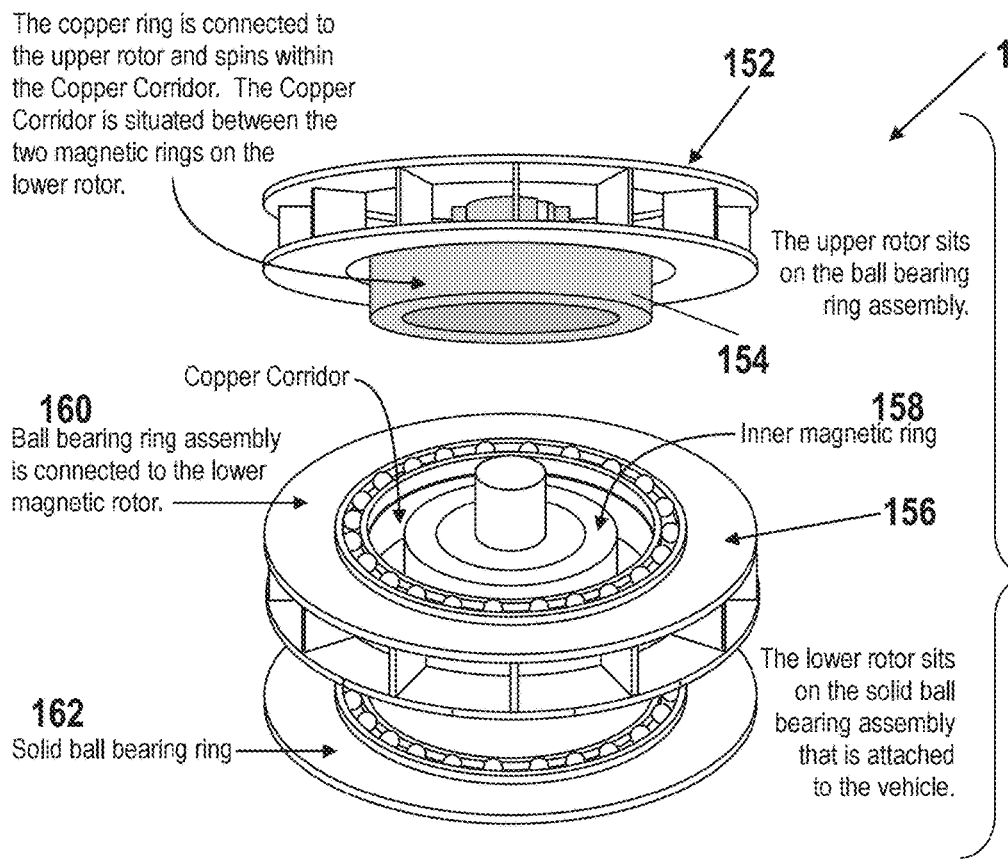
FIG. 26

The yellow Sun gear has a hole in it for the Center Shaft to pass through.

STATORLESS ELECTRICAL GENERATOR SYSTEM DRIVEN BY A FLOWING FLUID

CROSS-REFERENCE TO RELATED APPLICATIONS

This application claims the benefit of U.S. provisional application Ser. No. 63/041,503 filed Jun. 19, 2020, the disclosure of which is hereby incorporated in its entirety by reference herein.

BACKGROUND OF THE INVENTION

Field of the Invention

The present invention pertains to an electrical generator system which converts kinetic energy from a flowing fluid into electrical energy as the flowing fluid passes through the electrical generator. More particularly, the present invention pertains to such an electrical generator system which may be disposed on a vehicle so that as the vehicle is traveling a fluid through which the vehicle is traveling, such as air or water, the generator will generate electrical energy which may be harnessed for use to power electrical components of the vehicle or for storage. Even more particularly, the present invention has various embodiments, such as an electrical generator system which may be disposed on a vehicle so that as the vehicle is traveling a fluid air in this case, will generate electrical energy which may be harnessed for use to power electrical components of the vehicle or for storage. According to another embodiment, a stationary hydro-electrical generator system is designed to create electricity by utilizing flowing water, such as, from a waterfall or within water pipes.

Description of the Background Art

There are many known electrical generators which produce electricity/electrical energy which may be harnessed for use or storage, including generators that include fuel powered internal combustion engines and generators that are powered by a moving fluid such as hydroelectric generators powered by water flow and windmill type generators that are driven by the wind. The present invention is of the latter type.

Some known electrical generators that are powered by water flow or wind flow are disclosed in U.S. Pat. No. 7,402,021 (Henkenhaf), U.S. Pat. No. 4,960,363 (Bergstein), U.S. Pat. No. 4,034,231 (Conn et al.) and U.S. Pat. No. 3,807,890 (Wright).

While such known electrical generators are effective for their intended purposes, they remain to be improved on in terms of simplicity and efficiency.

SUMMARY OF THE INVENTION

An object of the present invention is to provide a statorless electrical generator system which is improved in comparison to conventional electrical generators in terms of simplicity and efficiency.

For a more complete understanding of the present invention, the reader is referred to the following detailed description section, which should be read in conjunction with the accompanying drawings. Throughout the following detailed description and in the drawings, like numbers refer to like parts.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations, and methods in which the inventive concepts are found.

There have been chosen specific embodiments of a generator system according to the invention and specific alternative embodiments and modifications thereto, the embodiments chosen for the purposes of illustration and description of the composition and method of the invention are shown in the accompanying drawings forming a part of the specification.

BRIEF DESCRIPTION OF THE DRAWINGS

FIGS. 11A, 11B are other front views similar to FIG. 10, while

FIG. 24 is a front perspective view of an electrical generator system according to another embodiment.

FIG. 25 is an exploded front perspective view of the electrical generator system of FIG. 24.

FIG. 26 is a partially exploded front perspective view of the electrical generator system of FIG. 24.

DETAILED DESCRIPTION OF PRESENT EXEMPLARY EMBODIMENTS ACCORDING TO THE PRESENT INVENTION

Overview

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 10:
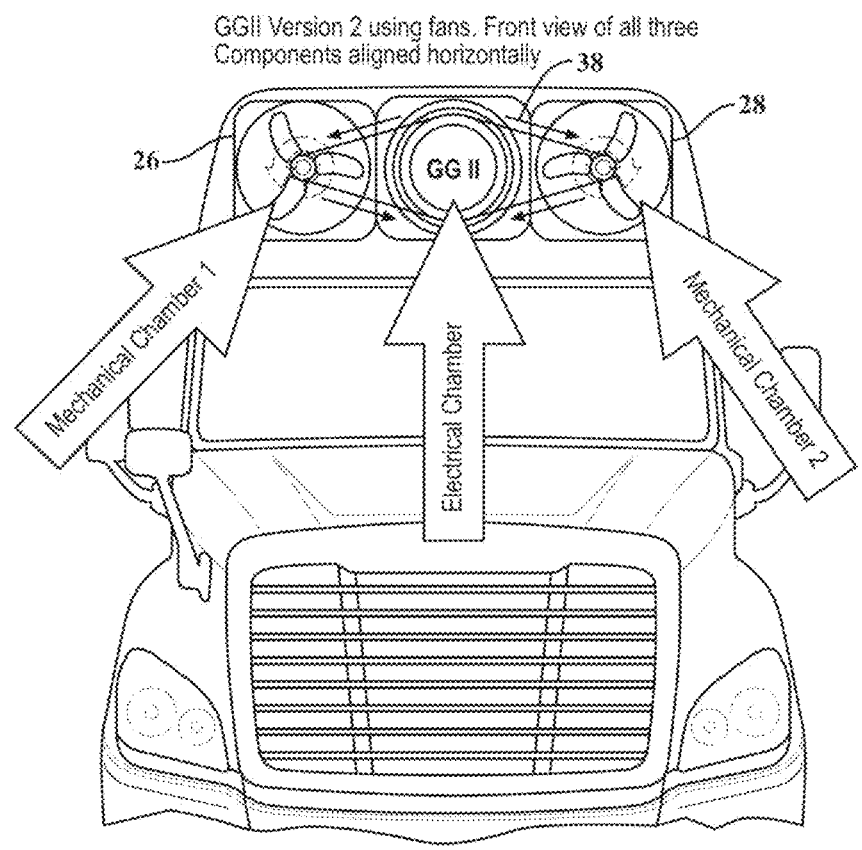
FIG. 10 is a front view of a statorless electrical generator system according to the second illustrative embodiment as disposed on a truck.
Figure 11A:
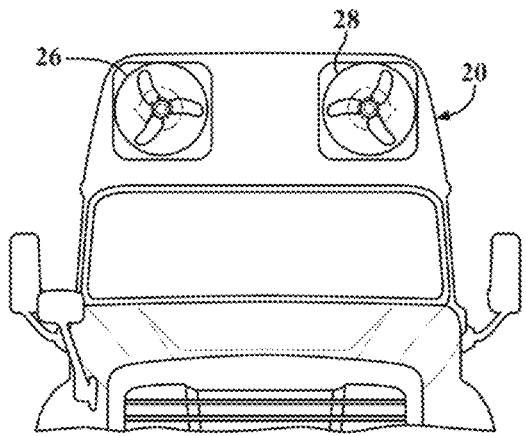
Figure 11B:
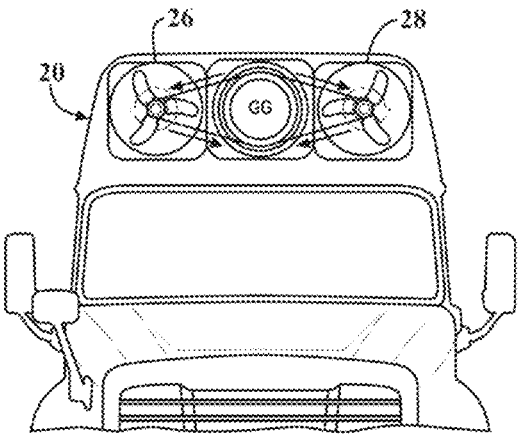
Figure 11C:
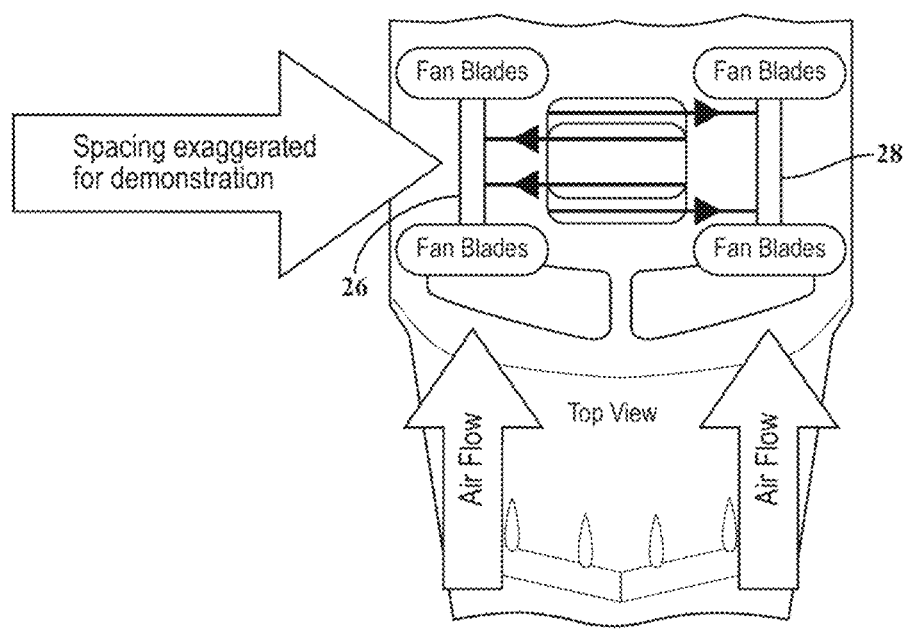
FIG. 11C is a schematic top plan view of the system in FIG. 10.
Figure 12A:
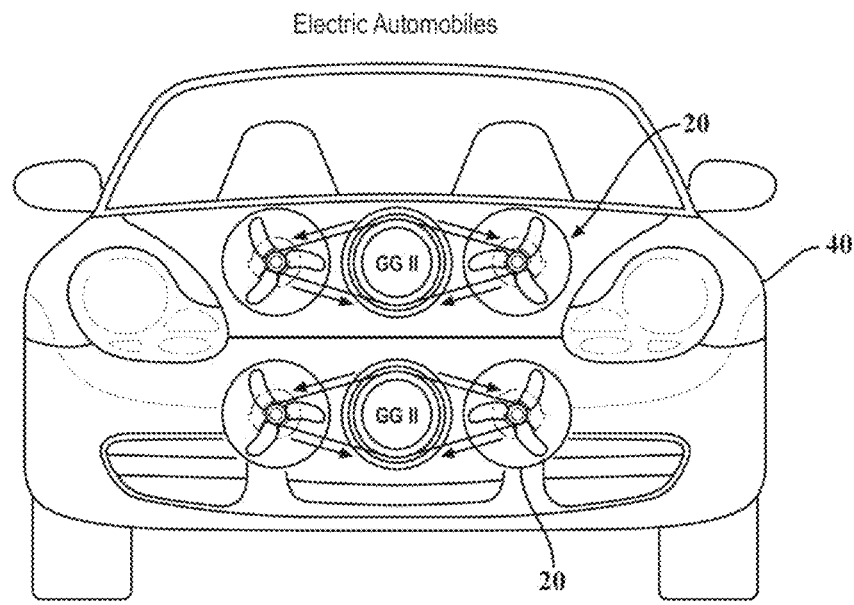
FIGS. 12A, 12B are schematic front views of a statorless electrical generator system including redundant generators according to a third illustrative embodiment of the present invention as disposed on an electric automobile.
Figure 13A:
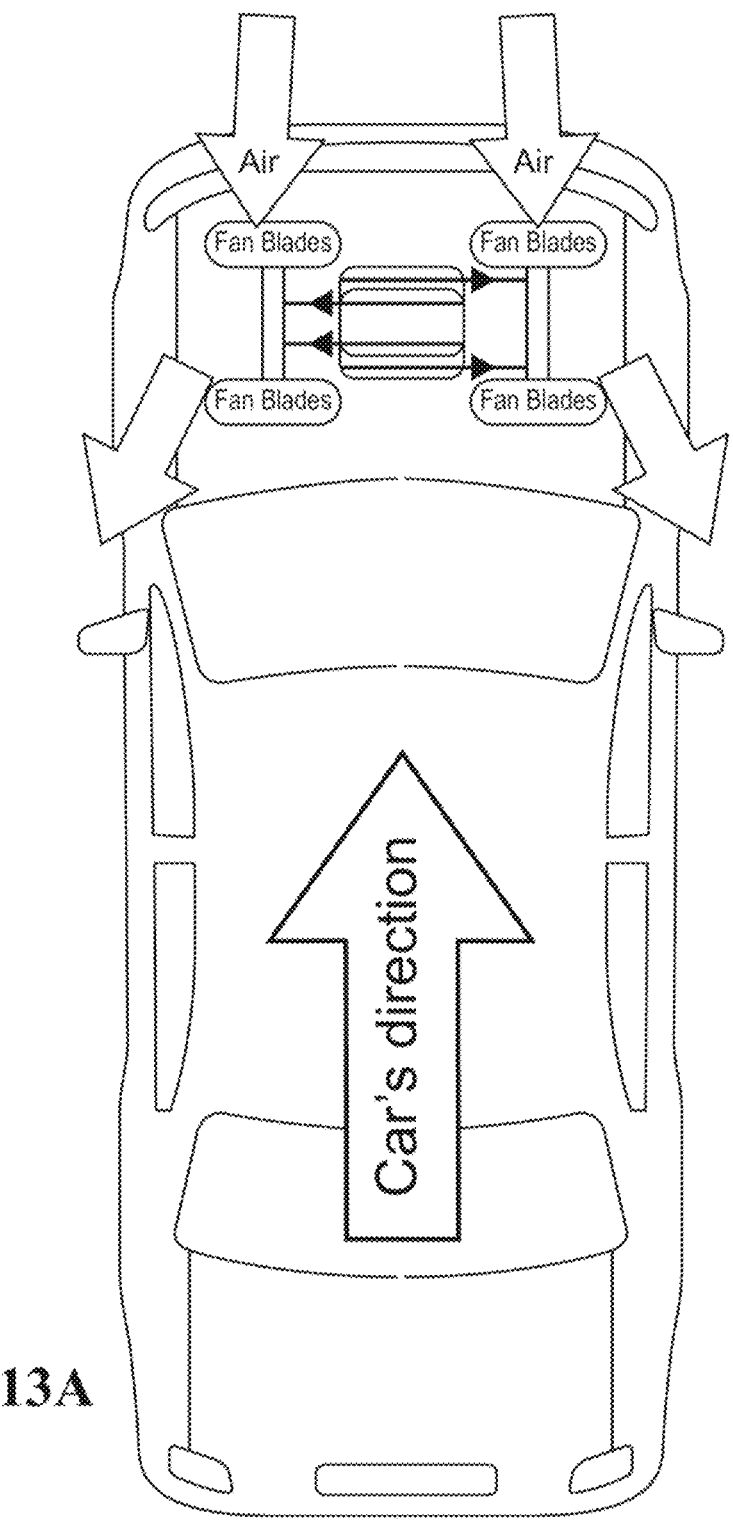
FIGS. 13A, 13B are respectively schematic top plan views of the systems of FIG. 12A, 12B.
Figure 13B:
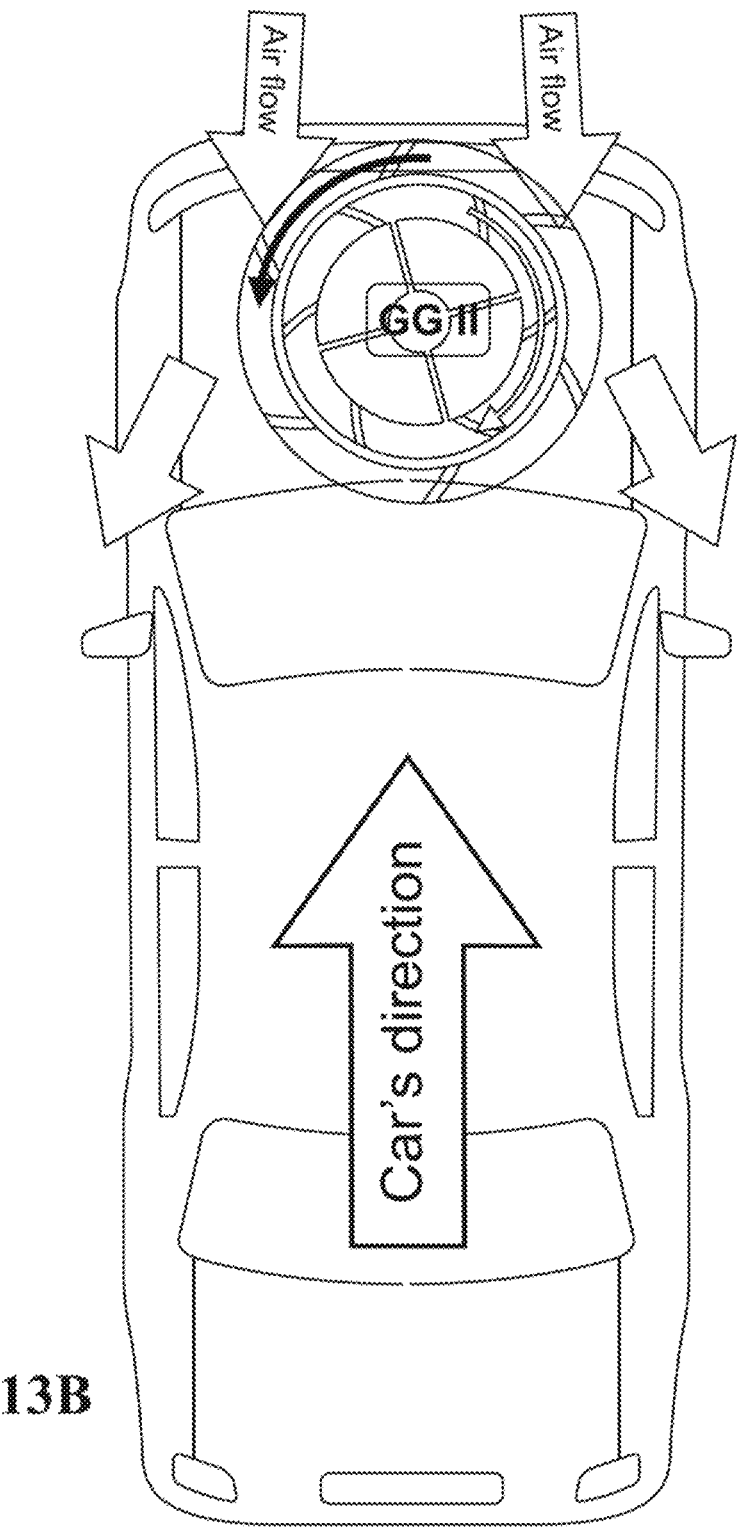
Figure 14:
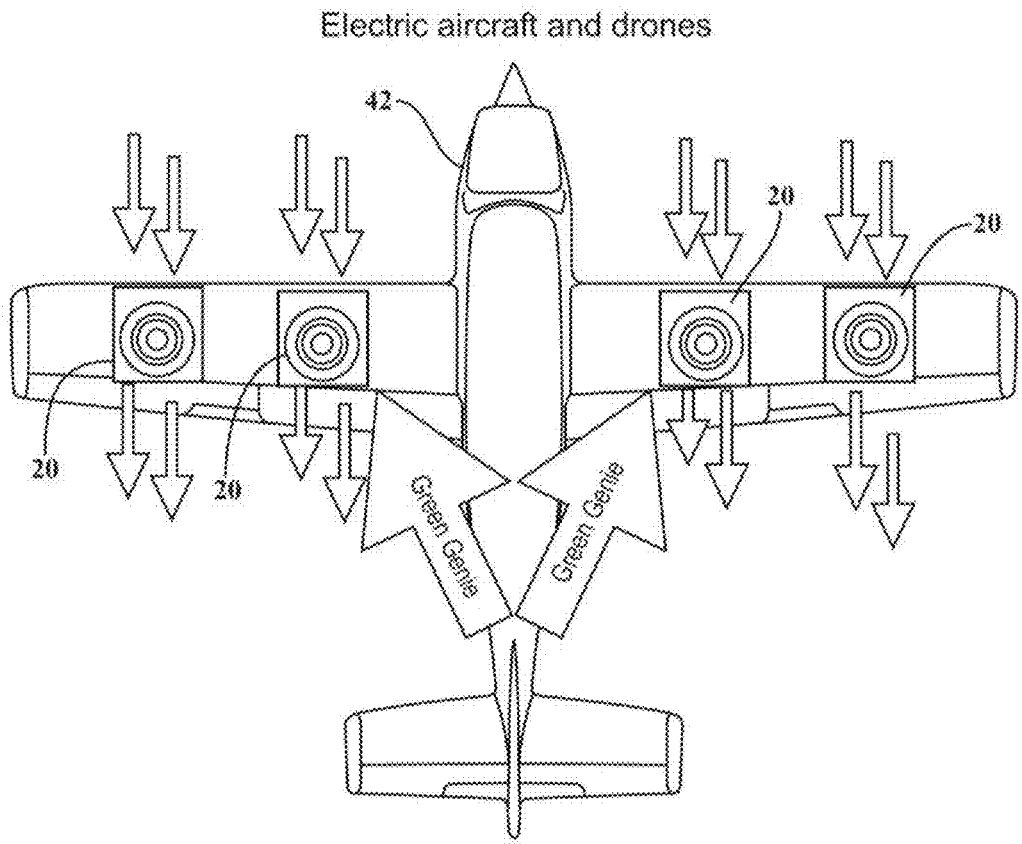
FIG. 14 is a top plan schematic view of electrical components of a statorless electrical generator system according to a fourth illustrative embodiment according to the present invention which is suitable for placement on an aircraft or a drone.
Figure 15A:
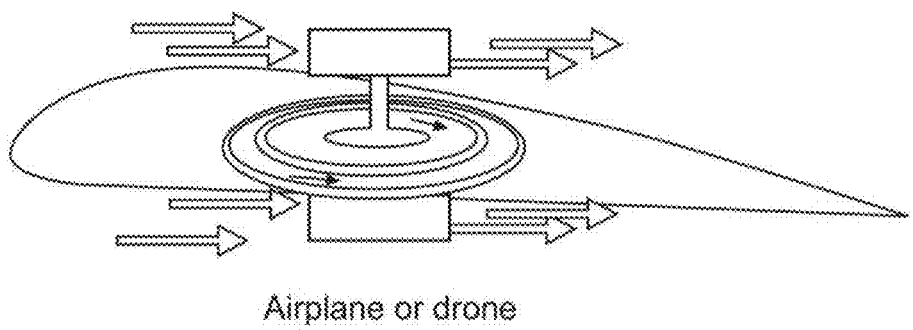
FIGS. 15A, 15B are schematic side view of the system of FIG. 14 disposed with a wing of the aircraft or drone.
Figure 15B:
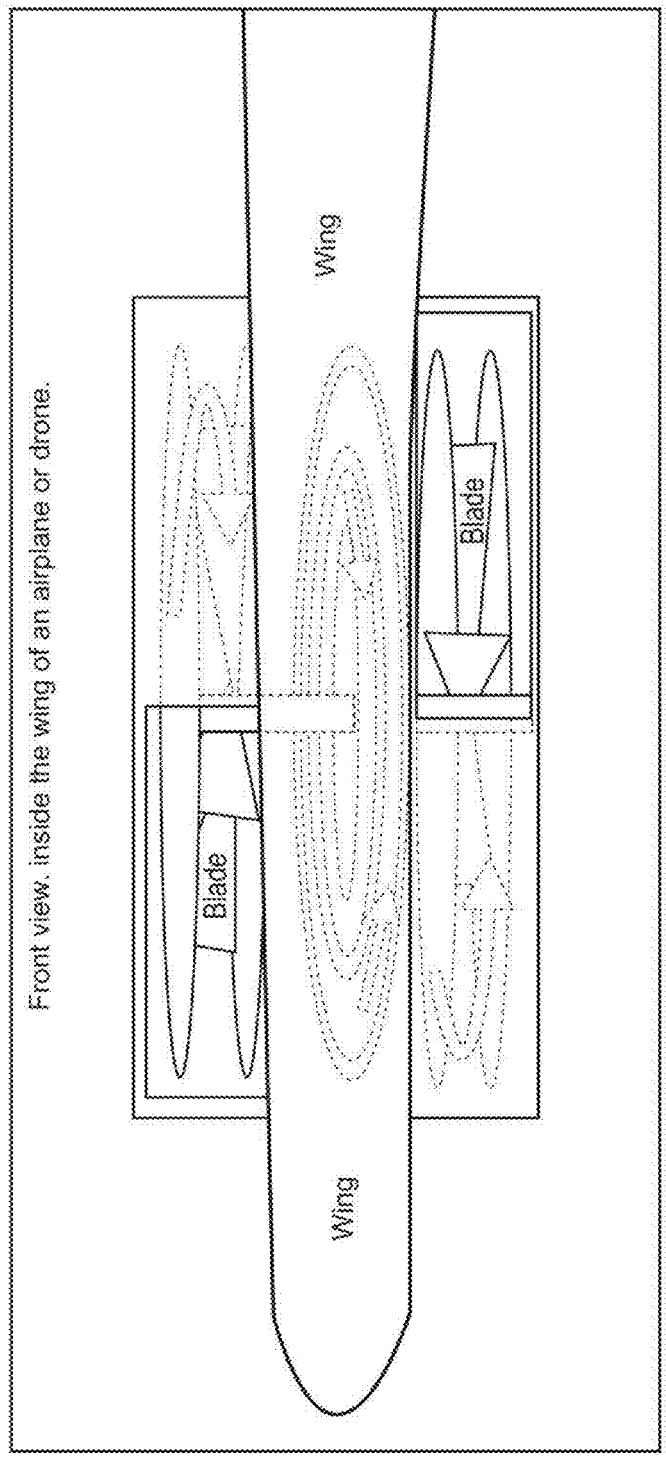
Figure 16A:
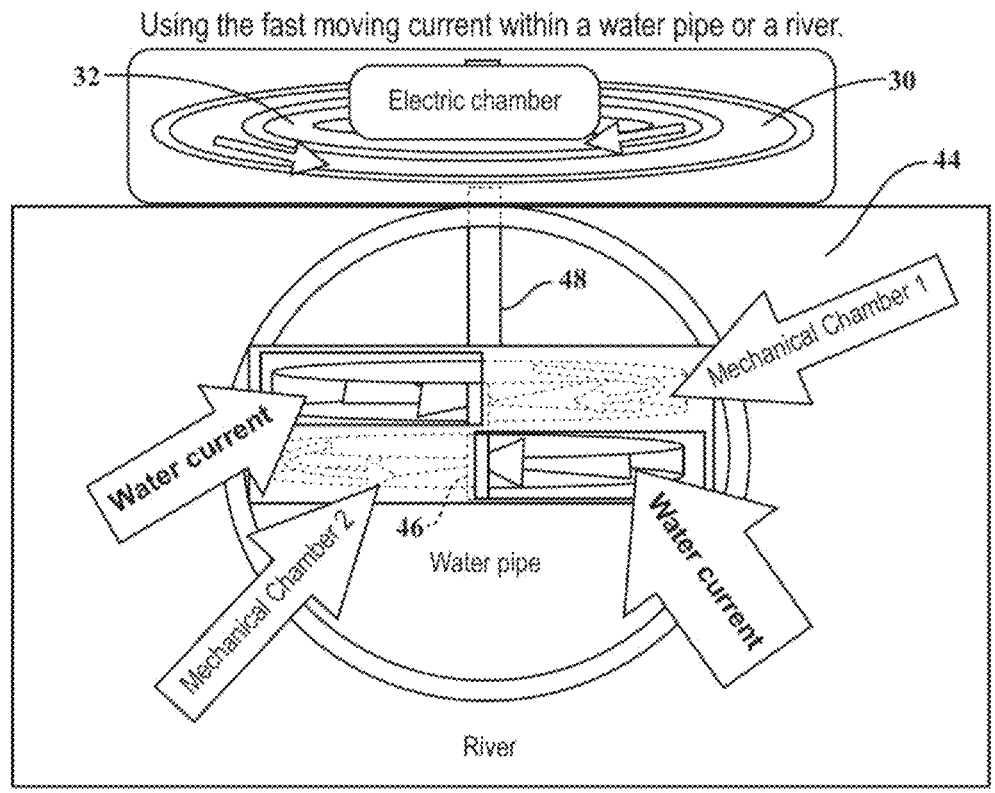
FIGS. 16A, 16B are schematic front views of a statorless electrical generator system as disposed in conjunction with a pipe through which water flows according to a fifth illustrative embodiment of the present invention.
Figure 16B:
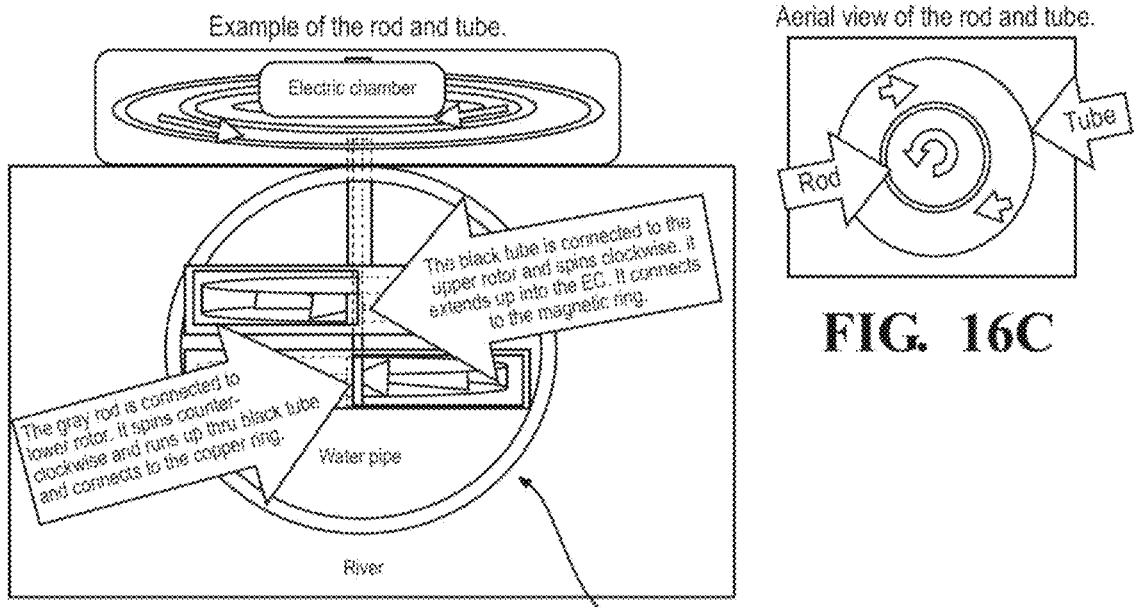
Figure 16C:
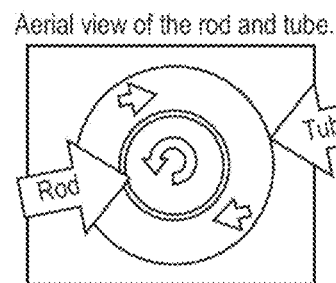
FIG. 16C is a schematic top view of a rod and a tube which connect the mechanical and electrical components in the system of FIGS. 16A, 16B.
Figure 17:
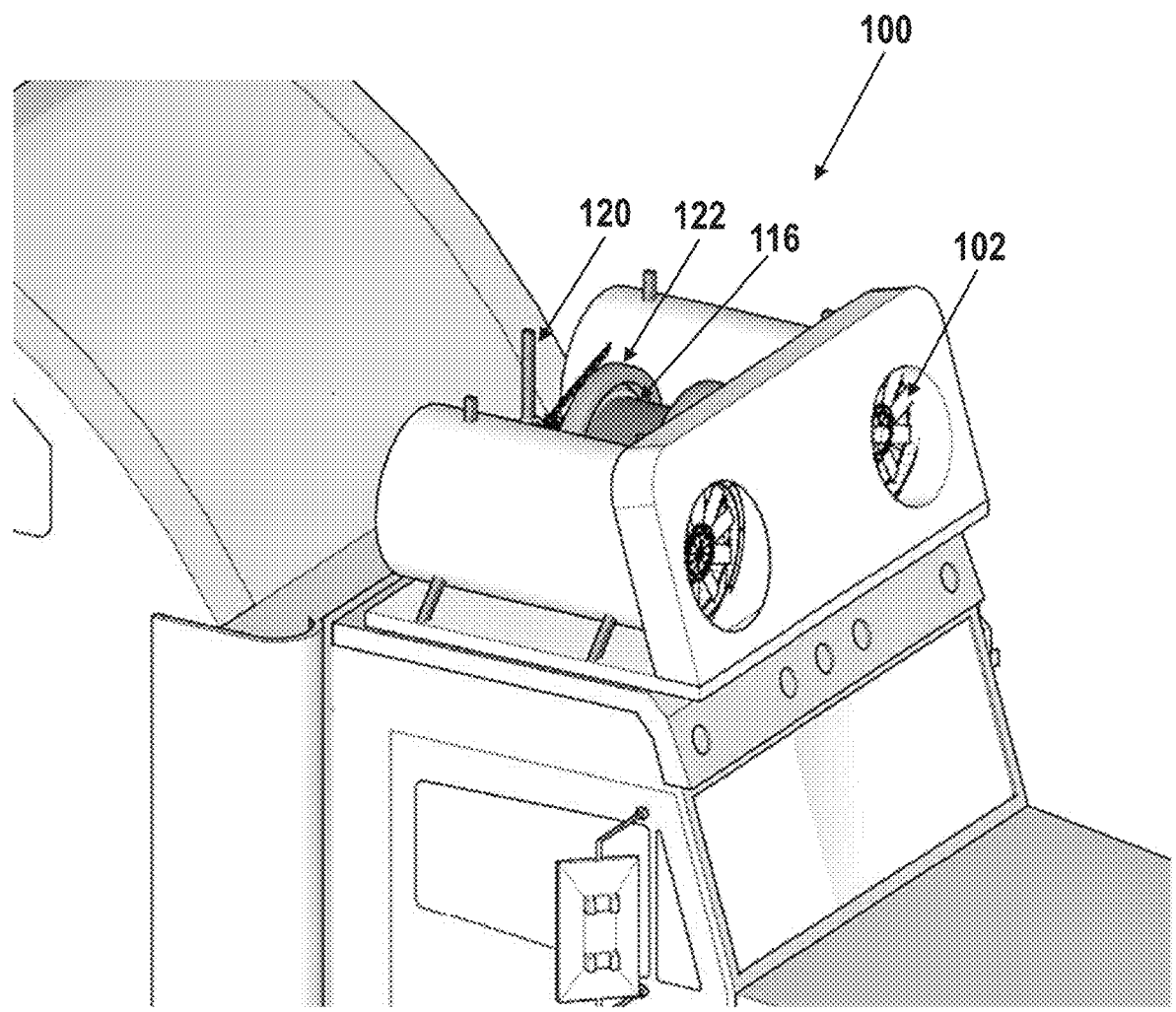
FIG. 17 is a front perspective view of an electrical generator system according to another embodiment, installed upon a vehicle, illustrated with a cover removed therefrom.
Figure 18:
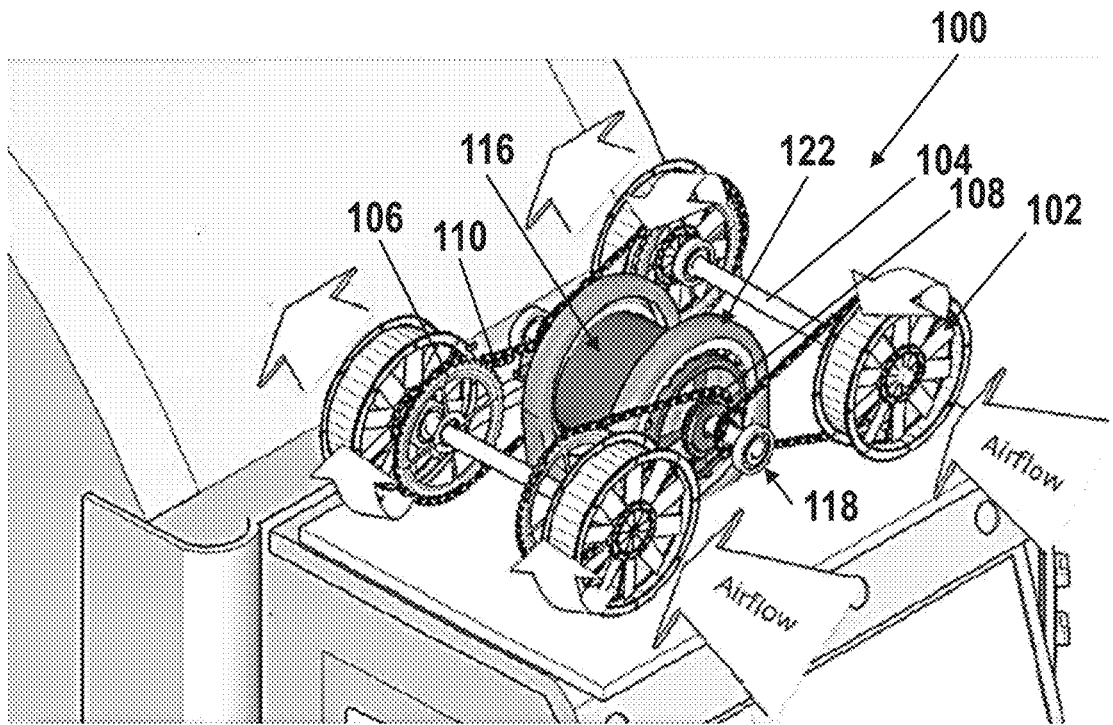
FIG. 18 is a top perspective view of the electrical generator system and the vehicle of FIG. 17.
Figure 19:
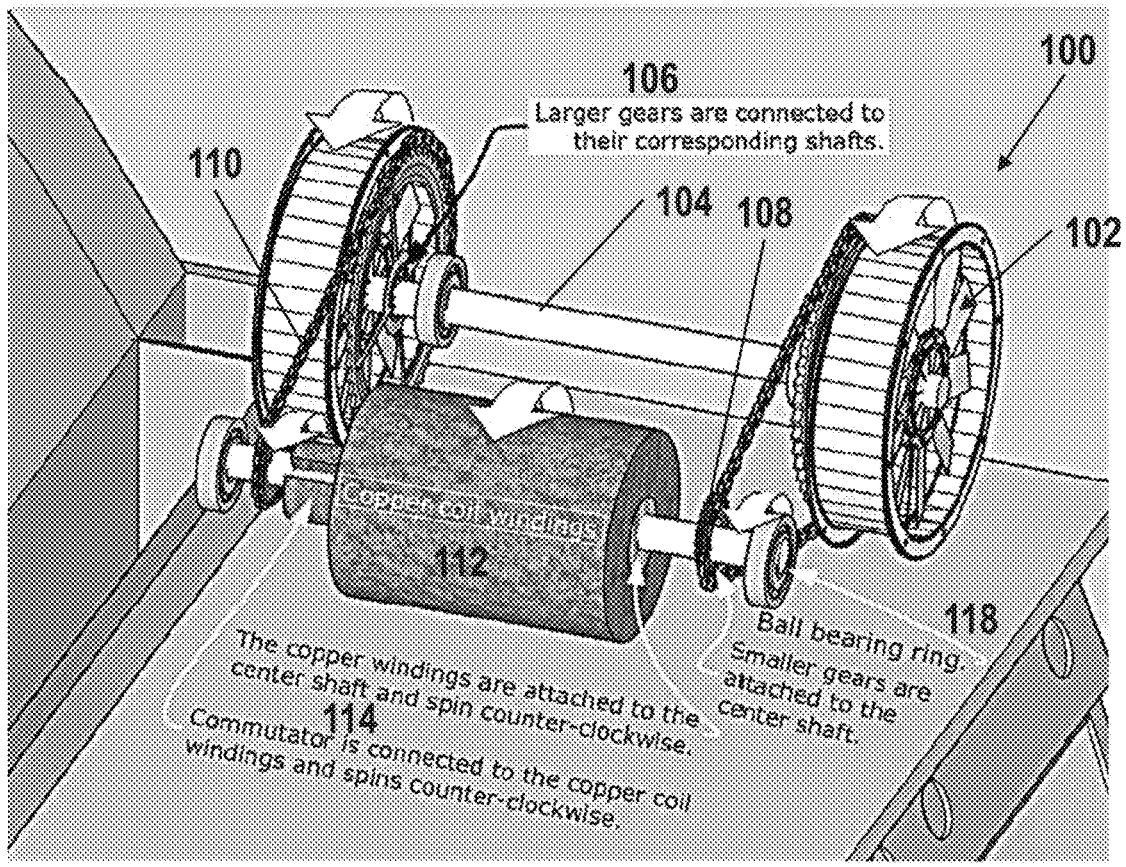
FIG. 19 is another top perspective view of the electrical generator system and the vehicle of FIG. 17.
Figure 20:
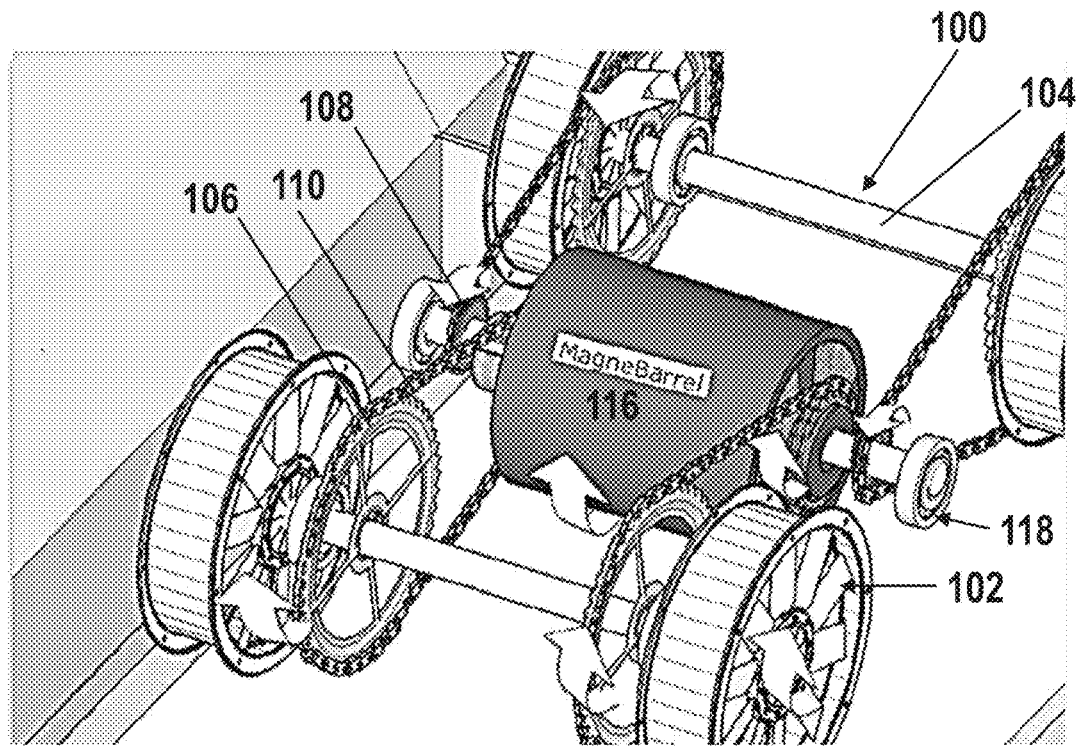
FIG. 20 is another top perspective view of the electrical generator system and the vehicle of FIG. 17.
Figure 21:
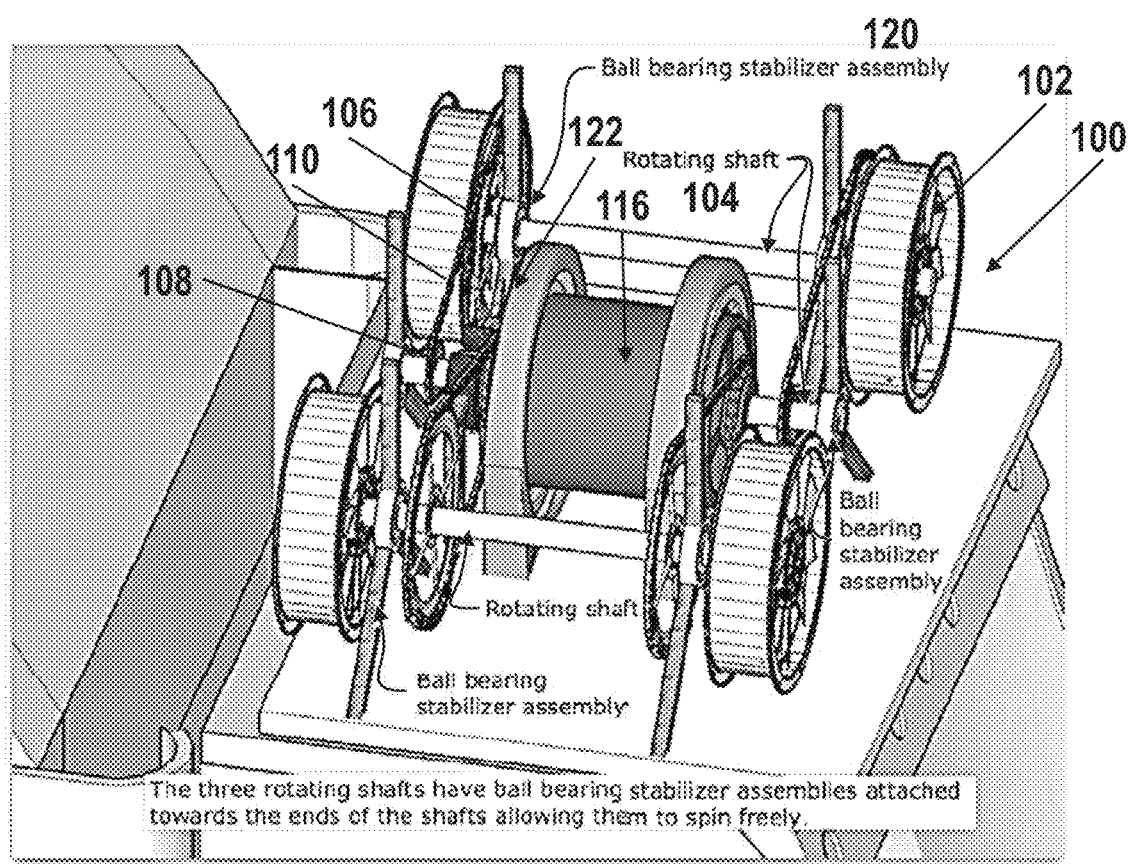
FIG. 21 is another top perspective view of the electrical generator system and the vehicle of FIG. 17.

Exemplary embodiments of the present invention will now be described in some detail, with reference to FIGS. 1-16C, in which FIGS. 1-7 depict a first exemplary embodiment, FIGS. 8-11C depict a second exemplary embodiment, FIGS. 12A-13 depict a third exemplary embodiment, FIGS. 14-15B depict a forth exemplary embodiment, and FIGS. 16A-16C depict a sixth exemplary embodiment. It should be understood that only structures considered necessary for clarifying the present invention are described herein. Other conventional structures, and those of ancillary and auxiliary components of the system, are assumed to be known and understood by those skilled in the art.

Figure 1:
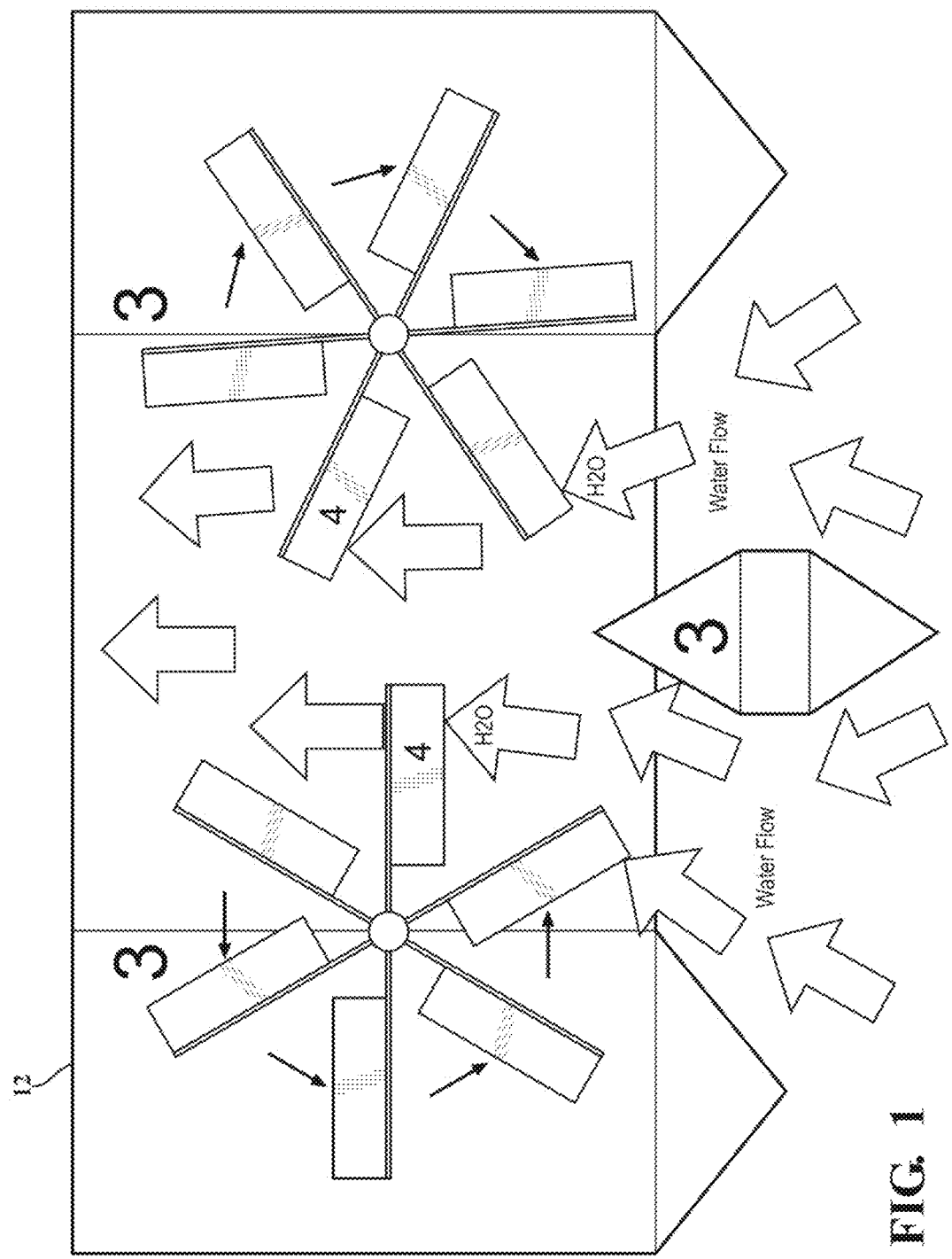
FIG. 1 is a top plan schematic view of a statorless electrical generator system according to an illustrative first exemplary embodiment according to the present invention, and provided in a flowing water stream.
Figure 2:
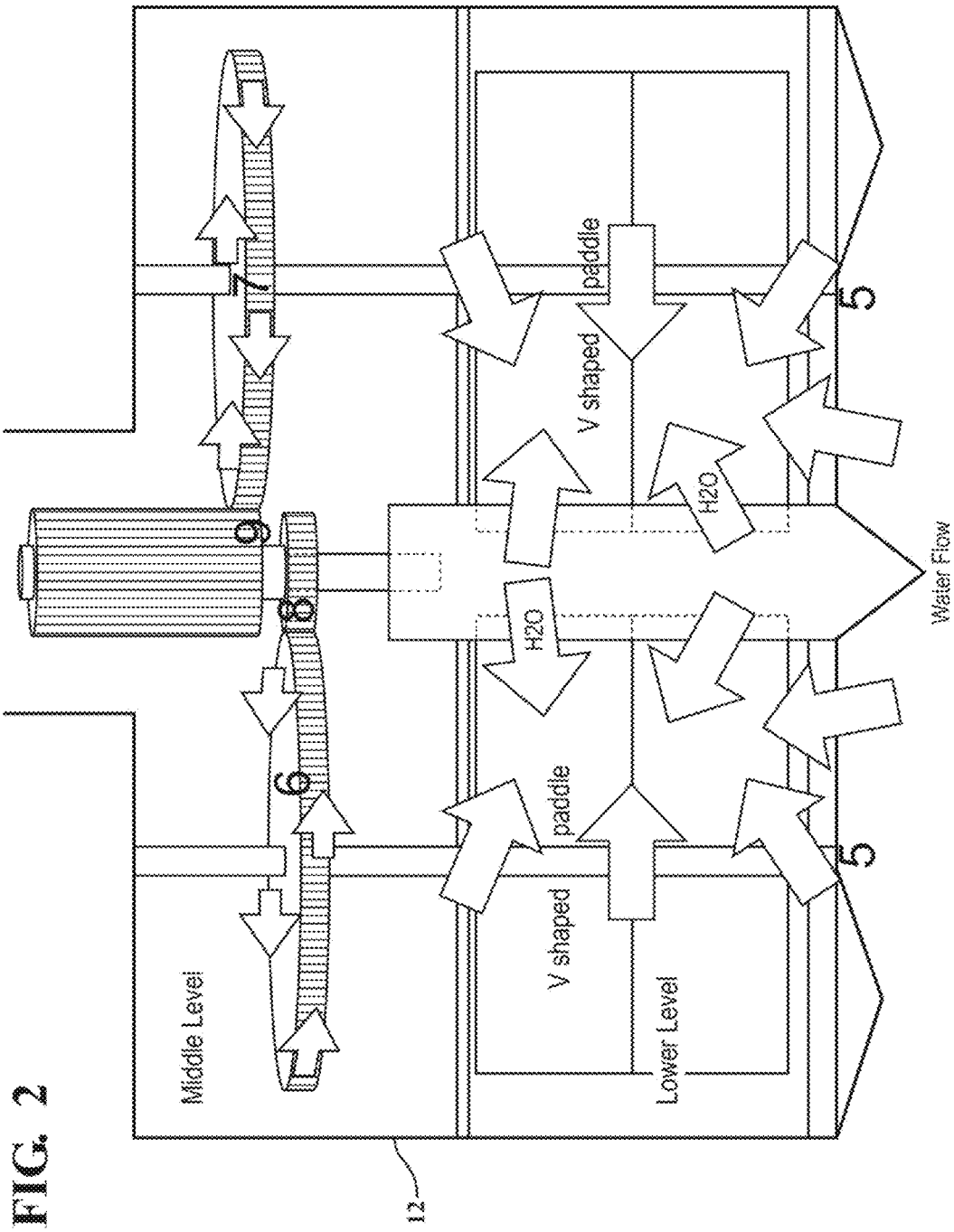
FIG. 2 is a side schematic view of the system of FIG. 1 showing internal structure of the system.
Figure 3:
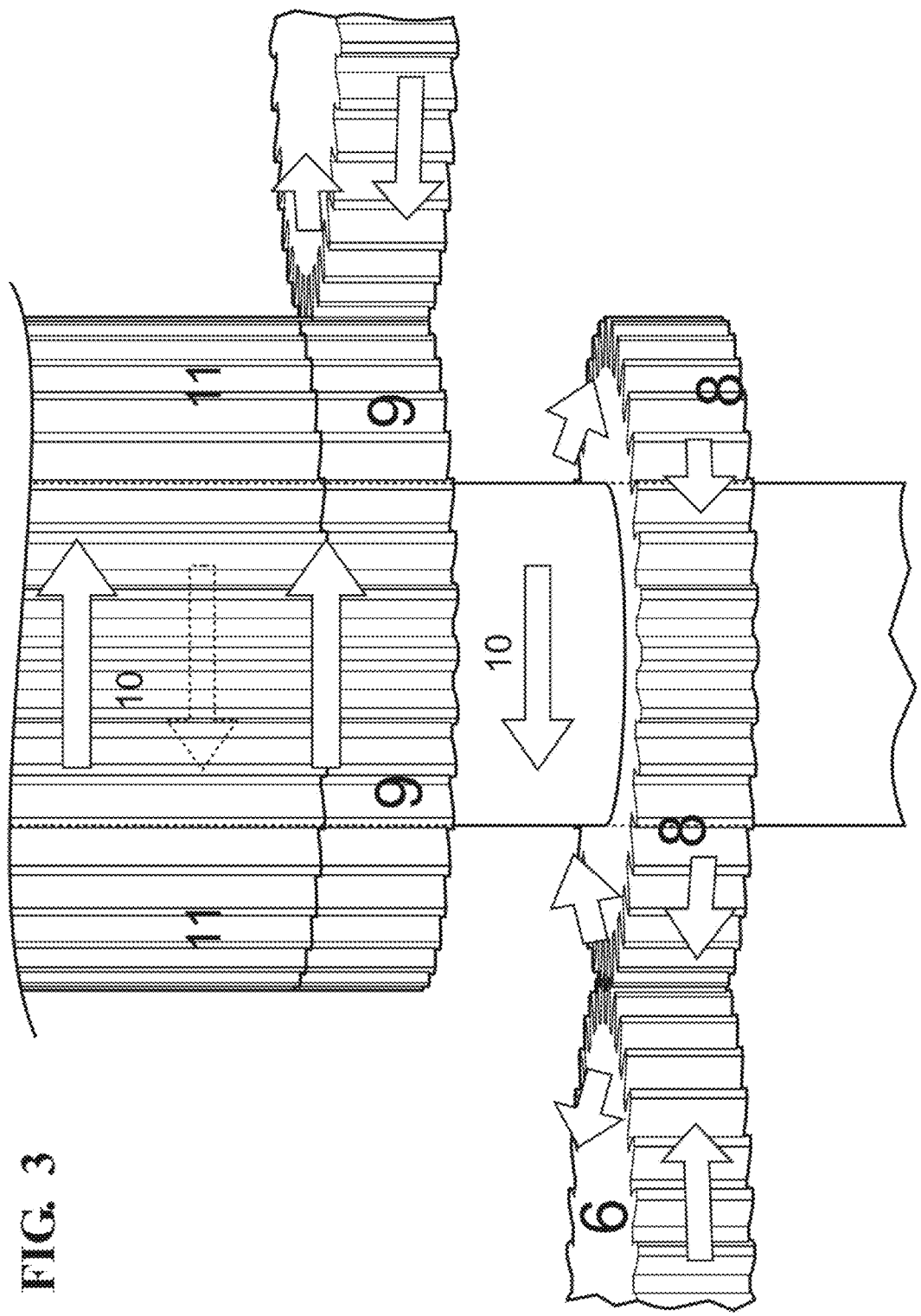
FIG. 3 is an enlarged view of some of the mechanical components of FIG. 2.
Figure 4:
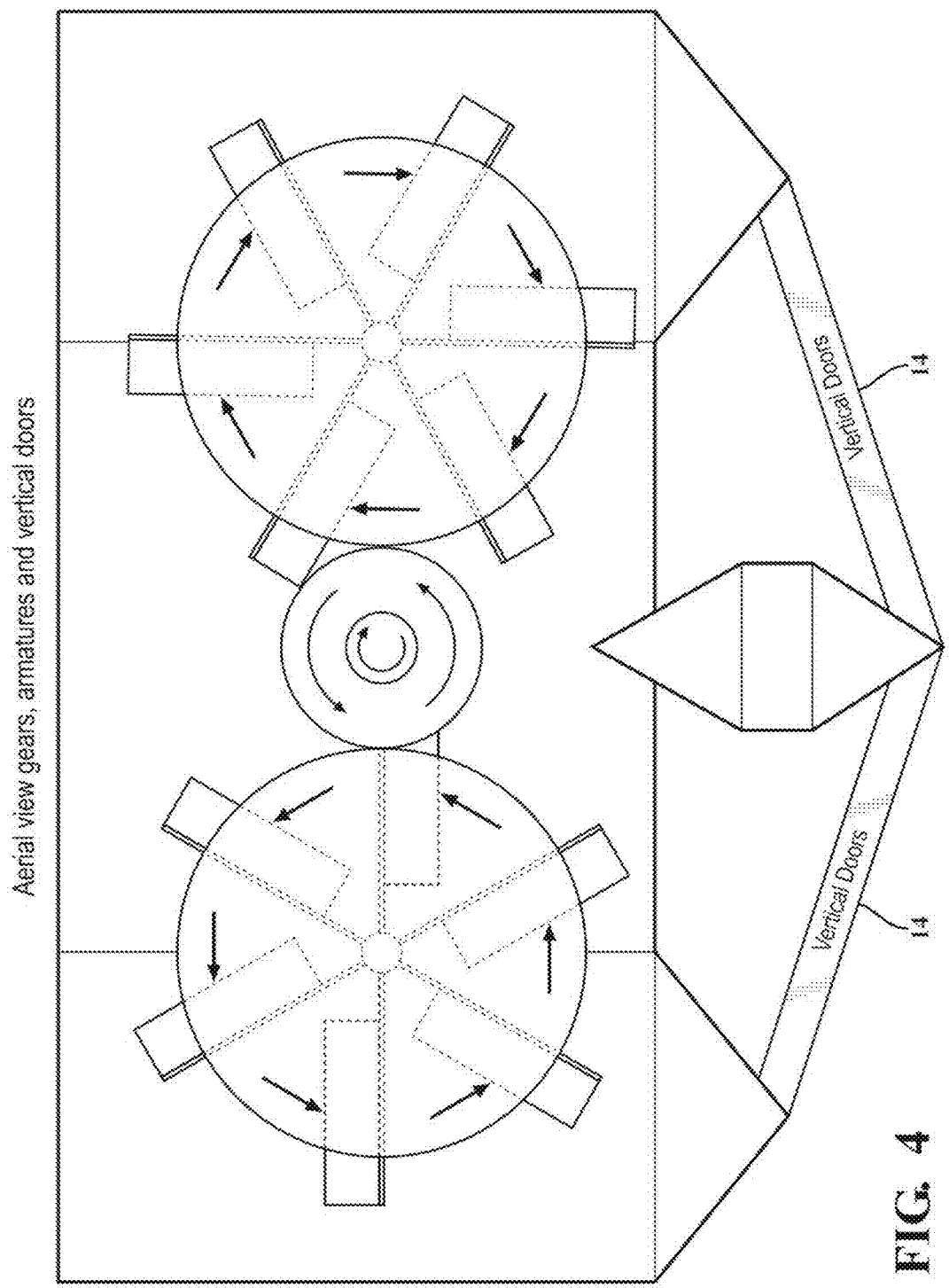
FIG. 4 is another top plan schematic view of the statorless electrical generator system of FIG. 1, but also depicting some additional components.

Referring to FIGS. 1-7 a statorless electrical generator system according to an illustrative first exemplary embodiment, and provided in a flowing water stream. As shown in FIG. 1, the system generally comprises two side by side mechanical rotors (1, 2) placed with their axes of rotation extending vertically within an underwater housing unit (12) containing three separate, horizontally aligned chambers which is placed in a body of flowing water such as a river or stream. The design and structure of the system direct the water to flow through the middle chamber only, in-between the two rotors. The left rotor (1) is placed at the edge of the left chamber exposing the inner side of blades of the rotor to the water flow. The right rotor (2) is similarly placed at the edge of the right chamber with its blades exposed to the water flow. As the blades are exposed to the water flow in the middle chamber, the rotors turn in opposite directions relative to each other, i.e., the left rotor (1) turns counterclockwise and the right rotor (2) turns clockwise. Water flows through the underwater housing unit (12) moving the blades (4) which are connected to the rotors, causing the rotors to turn. Structure may be provided which selectively allows and prevents the water flow from entering the housing unit (12) to move the rotors (1, 2). For example, vertically extending doors (14) may be provided such as shown in FIG. 4, and these doors may be selectively opened and closed manually or with the assistance of a motor or the like (not shown).

Referring to FIG. 2, the bottom portions (5) of the rotors are secured to the base of the underwater housing unit (3). The 2 rotors have respective vertically extending shafts that extend up from the rotors into the middle level of the housing unit (3) and are respectively connected to rotating gears (6, 7). The gear (6) on the left rotor is connected at a lower level closer to its rotor lower than the gear (7) fastened on the right side rotor. Connected in between the left and right gears are a smaller secondary set of gears, (8, 9) one on top of the other. The secondary gear (8) connected to the lower left gear (6), rotating clockwise will be positioned below the other secondary gear (9) which is positioned on top, is connected to the right side gear (7) and will rotate counterclockwise.

Figure 5:
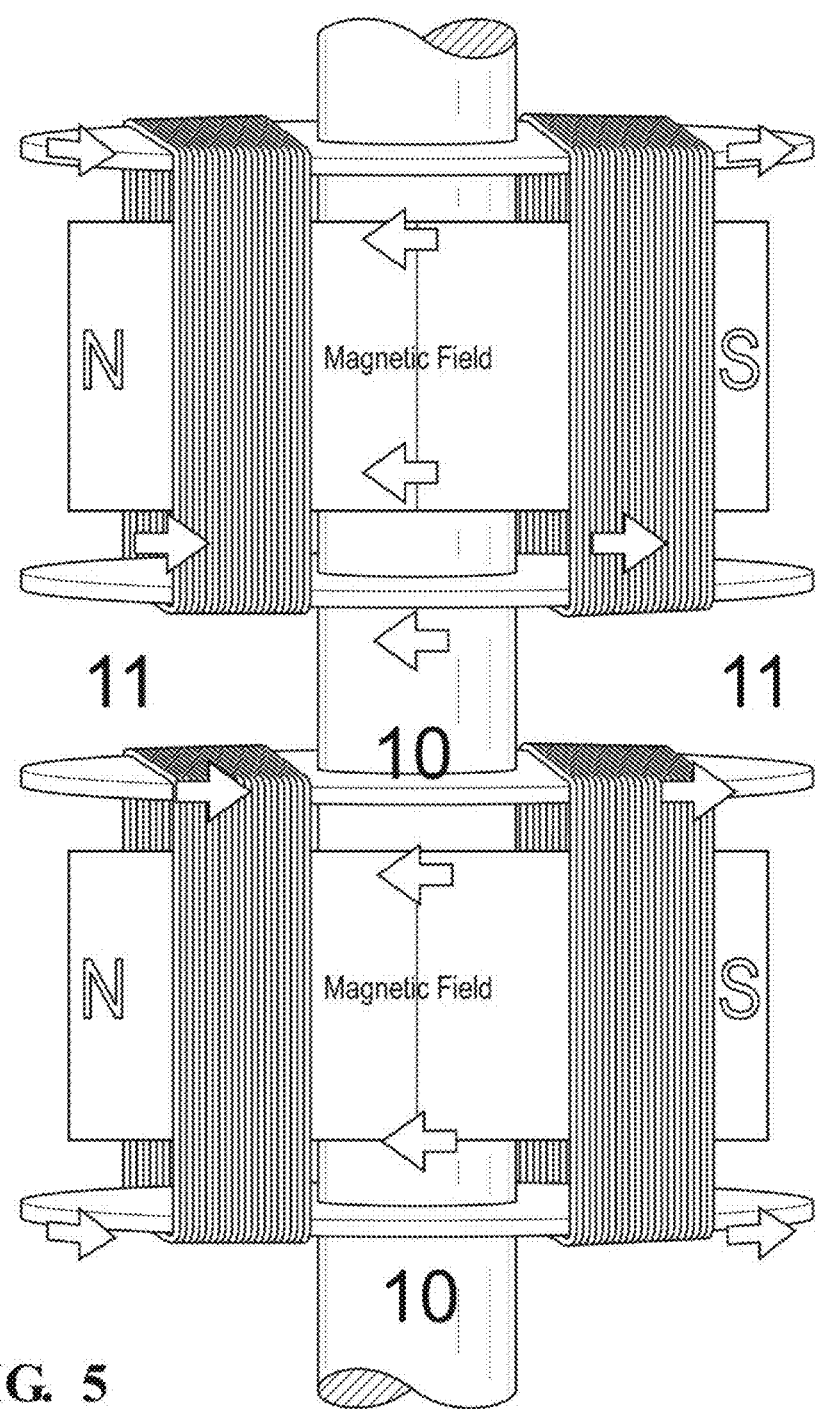
FIG. 5 is an enlarged view of some of the electrical components of FIG. 2.
Figure 7:
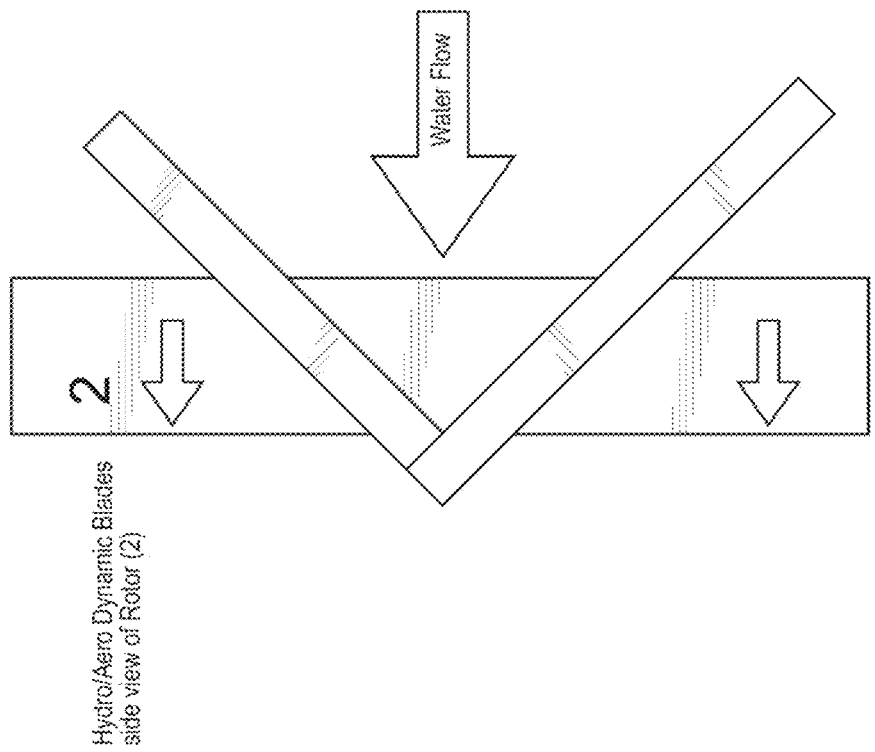
FIG. 7 is a further enlarged plan view of part of FIG. 4 showing water flow engaging blades of one mechanical rotor.
Figure 6:
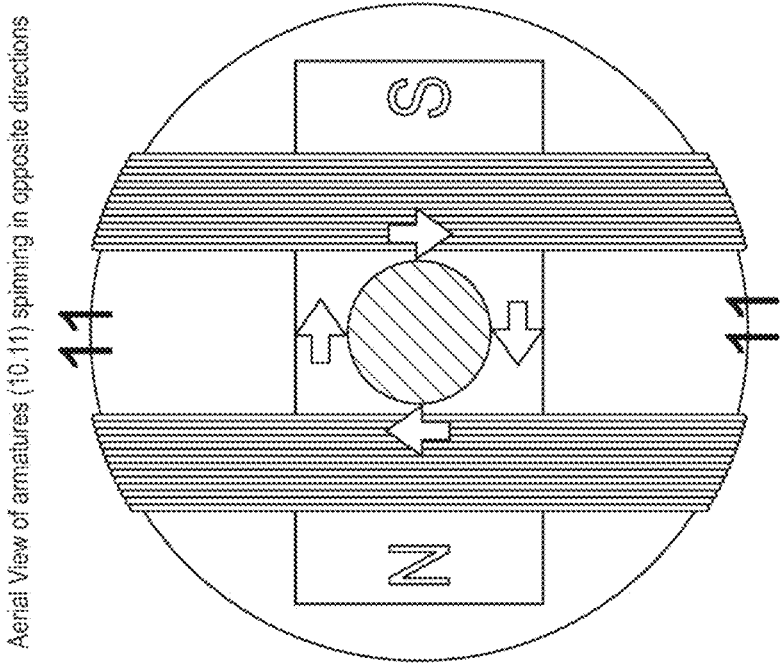
FIG. 6 is a top plan view of the structure shown in FIG. 5.
Figure 8:
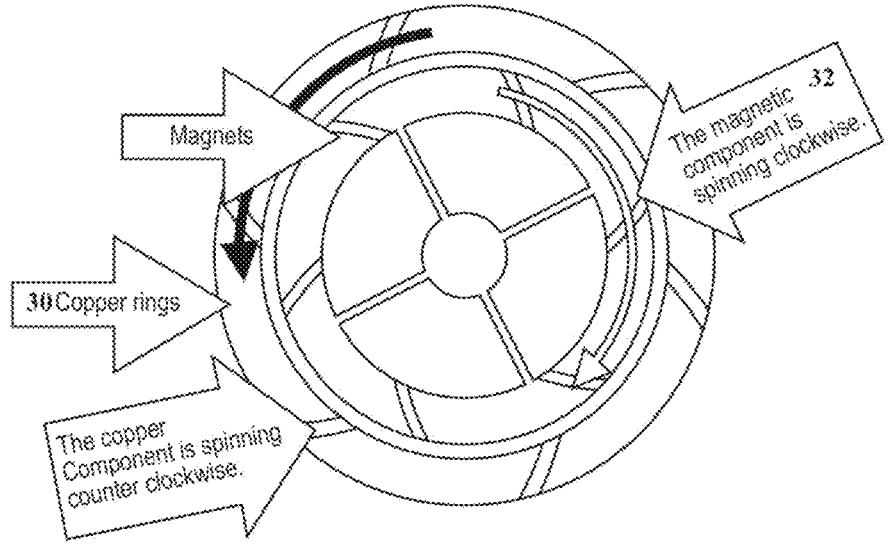
FIG. 8 is a top plan schematic view of electrical components of a statorless electrical generator system according to a second illustrative embodiment according to the present invention which is suitable for placement in a flow of air, water, or other fluid.

Referring to FIG. 3-6, there is shown schematically how the mechanical and electrical components of the system cooperate to produce electrical energy. FIG. 3 is an enlarged, close up view of the secondary gears (8, 9) showing how they are positioned and how they rotate in association with inner and outer armatures (10, 11) that will generate electrical energy as they rotate. FIG. 5 further shows a side view of the armatures (10, 11) as two electrical elements needed to produce electricity in this embodiment of the invention, while FIG. 6 is a schematic top plan view of the armatures (10, 11) rotating in opposite directions. The inner armature (10) connects to the magnetic elements and spins in one direction, e.g., clockwise, and the outer armature (11) connects to the copper elements and spins in the opposite, counterclockwise direction. The lower secondary gear (8) is connected to the inner armature (10). It will spin clockwise. The upper secondary gear (9) is connected to the outer armature (11) and will spin counterclockwise. The inner armature (10) extends up through the middle of the outer armature (11). FIG. 4 is a schematic aerial view of the gears, armatures, and vertical doors. The vertical doors (14) are designed to deflect the water when closed. FIG. 7 is a general depiction of the water flow engaging blades of the two rotors (1, 2) at a central position where portions of the blades overlap, but at different levels, so as to turn the rotors in opposite directions. The spinning rotors (1, 2) in turn rotate the gears (6, 7) to which they are attached, and these gears in turn rotate the secondary gears (8, 9) with which they are operatively engaged, and finally the secondary gears rotate the armatures (10, 11) to which they are fixed in opposite directions to produce electrical energy that may be harnessed for storage and use.

Referring to FIGS. 8-11C there is depicted a second exemplary embodiment of a statorless electrical generator system (20) according to the present invention. This embodiment may be constructed more compactly than the first embodiment in FIGS. 1-7, and may be used in more diverse applications, e.g., it may be driven by a flow of gas such as air or a liquid such as water, and it may be provided on moving vehicles as well as in fixed locations such as in river or pipe in or through which a fluid is flowing.

Just as with the first embodiment, this system (20) of the second embodiment is a "statorless" electrical generator that converts kinetic energy of a moving fluid such as forced air or flowing into electrical energy. This system is statorless because it includes magnetic and copper components which are simultaneously rotated in opposite directions thus producing an electromagnetic field which can then be harnessed and used as desired, including for powering other electrical components of a vehicle on which the system is provided. Likewise, the electrical generator system (20) is "statorless" because the magnetic elements of the invention are no longer stationary. The magnetic elements spin in the opposite direction of the copper elements. This statorless feature allows the generator (20) to be mobile. The statorless features also creates a generator system (20) with spinning at twice the speed of a stator system, thereby creating more power for the vehicle.

Figure 9A:
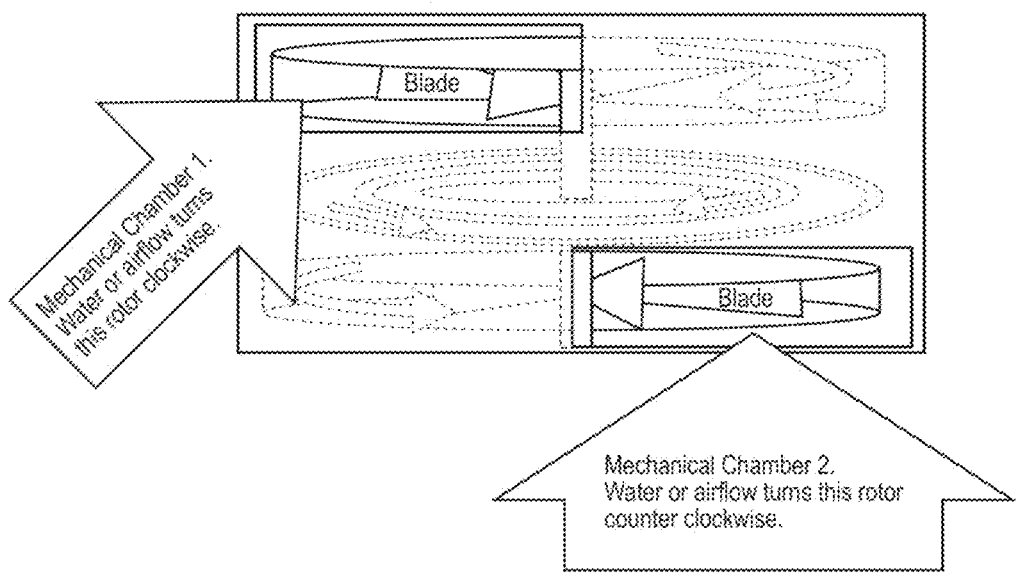
FIGS. 9A, 9B are side schematic views of the system of FIG. 8 showing internal structure of the system.
Figure 9B:
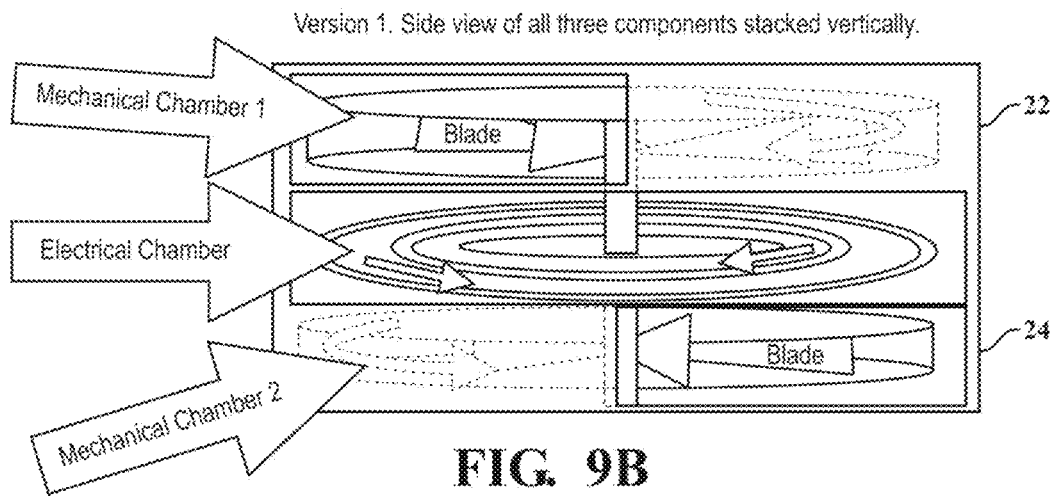

Referring to FIGS. 8-11C the system (20) has four basic components, i.e., two mechanical parts in the form of either two rotors (22, 24) Version 1 as in FIGS. 9A, 9B or two fans (26, 28) Version 2 as in FIGS. 10-11C that spin in opposite directions as they are engaged by a moving fluid, and two electrical components which may be in the form of a copper ring (30) and a magnetic ring (32) that are operatively connected to the two rotors (22, 24) or two fans (26, 28), respectively, such that the copper and magnetic rings (30, 32) also spin in opposite directions. The rotors (22, 24) may be arranged with their rotational axes extending vertically and can may have a smaller vertical dimension, and a larger horizontal dimension/diameter, while the fans (26, 28) may be arranged with their rotational axes extending horizontally such that their vertical and horizontal dimensions may be the same or similar sizes. Correspondingly, use of the system (20) including rotors (22, 24) may be more suitable for some applications than the system (20) including fans (26,28) where it is advantageous to have a smaller vertical dimension. The system (20) has three separate chambers, i.e., each of the two rotors (22, 24) or two fans (26, 28) are situated in its own mechanical chamber and the electrical components (30, 32) are situated in the third or electrical chamber.

Referring to FIGS. 9A, 9B, Version 1 of the system (20) which uses rotors (22, 24). The three chambers of the system are stacked one upon the other in the same vertical plane. The top mechanical chamber has an opening on the left side through which a flowing fluid may enter the chamber and engage against the blades of the rotor to rotate same, while the lower mechanical chamber has an opening on its right side through which a flowing fluid may enter the chamber and engage against the blades of the rotor to rotate same. Because the fluid flows through the two openings on opposite sides of the rotors, this causes the two rotors to spin in opposite directions. Each rotor (22, 24) has a connecting rod (34) or a tube (36) fixed at its center that extends along the rotor's rotational axis and which has another end or portion that is fixed to one of the electrical components (30, 32) that are contained in the electrical chamber such that the electrical components (30, 32) rotate together with the rotors (22, 24). As the two rotors spin in opposite directions the electrical components also spin in opposite directions thus producing the electromagnetic field within the electrical chamber that may be harnessed for storage or use.

While in the depicted embodiment the electrical chamber is situated between the two mechanical chambers, such arrangement is not required. The electrical chamber can be situated above the two mechanical components, sandwiched in between them or even below them. The fluid such as water or air flows thru the system (20) causing the two rotors, connecting rods, tubes, and electrical components to spin in opposite directions thus converting kinetic energy into electrical energy.

Referring to FIGS. 10-11C, Version 2 of the system (20) which uses fans to create an electromagnetic field and the three components may be aligned on the same horizontal plane. Similar to the rotors (22, 24) being in their own separate chambers in Version 1, the two fans (26, 28) are also disposed in their own chambers and also spin in opposite directions. In Version 2, the electrical chamber can also be situated above the mechanical chambers with the fans, in between them or underneath them. The fans may be connected to the electrical chamber with belts (38) which cause the electrical components (30, 32) to spin in opposite directions thus producing the electromagnetic field within the electrical chamber. As depicted, the system (20) may be disposed on a road-traveling vehicle such as a semi-trailer truck, with the fans (26, 28) disposed on a front upper portion of the truck cab above the windshield such that the air would be forced through the fans whenever the truck is traveling. Electrical energy generated by the system (20) may be harnessed and used to power various electrical components of the truck, such as lights, heating and cooling units, etc., or may simply be used to charge batteries of the truck. Although not depicted, covers may be provided to cover the fans (26, 28) when not in use, or the fans may be pivotally mounted to the truck such that they can be moved between an operative position with the rotational axes extending horizontally, and a nonuse position with the rotational axes extending vertically.

Other applications of the system (20) besides being mounted on trucks include being mounted on other types of vehicles such as automobiles, aircraft and boats, as well as being mounted in a flowing body of water such as a river and being mounted on pipes through which a fluid is flowing such as water or air. Some of such applications are discussed below in relation to FIGS. 12A-16C.

Figure 12B:
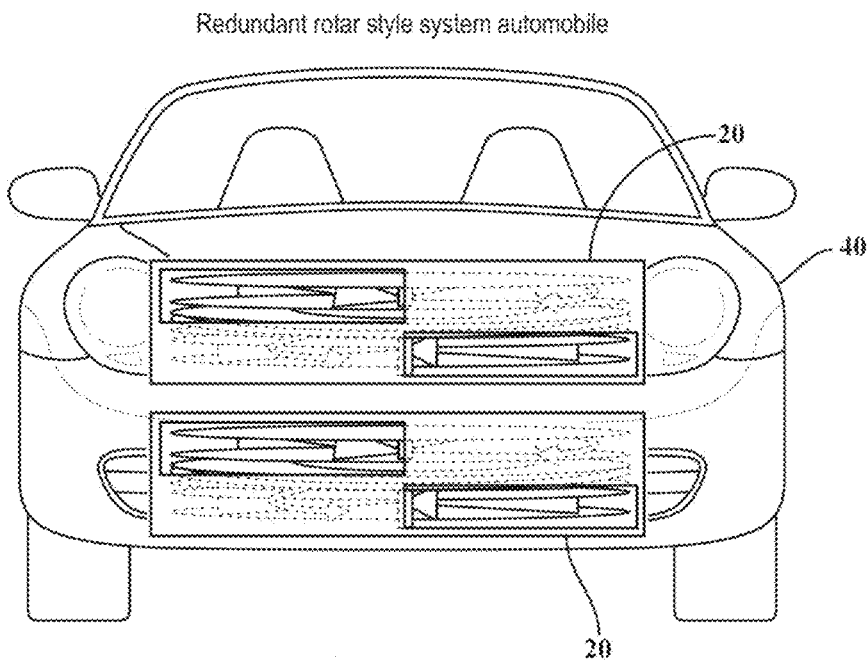

Referring to FIGS. 12A, 12B there are shown redundant arrangements of Versions 1 and 2 of the system (20) as provided with an automobile such as an electric automobile (40). With these arrangements, electric power generated by the systems (20) may be harnessed for use by the vehicle (40). Further, the systems (20) may be operated simultaneously or alternatively, e.g., if one of the systems (20) experiences abnormal operation due to overheating or any other reason, that system may be shut down and the other system (20) may be switched on or permitted to continue operating.

FIGS. 13A, 13B are respective, schematic top plan views of the systems (20) in FIGS. 12A, 12B.

Referring to FIGS. 14-15B, there is shown an arrangement of the system (20), which may be Versions 1 and 2 of the system (20), as provided with an aircraft such as an electric aircraft or drone (42). In the depicted arrangement one or two of the systems (20) is provided with each wing of the aircraft. In this arrangement the mechanical chambers with the rotors (22, 24) or the fans (26, 28) would be provided on the outside of the wings so that they would be engaged by air as the aircraft flies, while the electrical chamber may be provided inside of the wings.

Referring to FIGS. 16A-16C, there is shown an arrangement of the system (20), which may be Version I of the system (20), as provided within a pipe (44) through which a fluid is flowing. Such arrangement could also be provided with a flowing body of water such as a river. In this arrangement the mechanical chambers with the rotors (22, 24) would be provided on the inside of the pipe (44) so that they would be engaged by fluid flowing through the pipe, while the electrical chamber may be provided outside of the pipe. The rotors (22, 24) may be respectively connected to the electrical components (30, 32) via respective shafts or tubes (46, 48) that are disposed coaxially one inside the other, such that as the rotors (22, 24) rotate in opposite directions to each other, the electrical components also rotate in opposite directions to each other for generating electrical energy that may be harnessed for use or storage.

FIGS. 17-23 illustrate an electrical generator system 100 according to another embodiment, illustrated installed on a roof of a land vehicle, such as a semi-truck. The electrical generator system 100 becomes operational as air flows through two wind tunnels. Sides and a top of a cover are not shown. Air passes through four fans 102, causing the fans 102 to spin. Each pair of fans 102 are mounted upon a connecting shaft 104. Each pair of fans 102 rotate with the corresponding shaft 104. Each pair of fans 102 rotate in an opposite rotary direction to counter rotate as illustrated by the rotary direction arrows in FIGS. 18-20. A large set of reduction gears or sprockets 106 are provided on each side and are also connected to the corresponding shaft 104. The larger gears or sprockets 106 are connected to smaller gears or sprockets 108 on the center shaft 104 via chains or belts 110.

Copper coil windings 112 are attached to the center shaft 104 to spin counterclockwise. A commutator 114 is connected to the copper coil windings 112 and spins counterclockwise. A magnet barrel 116 encapsulates the copper elements 112. Magnetic elements are embedded within the sides of the magnet barrel 116. As the copper elements 112 spin counter-clockwise, the magnet barrel 116 spins clockwise creating the statorless electric generator system 100.

The shafts 104 are supported for rotation within ball bearing assemblies 118. Each ball bearing assembly 118 is supported within a stabilizer assembly 120. Two magnet barrel 116 stabilizers 122 secure the magnet barrel 116 in place. Ball bearing assemblies 124 are supported with the stabilizers 122 to support the magnet barrel 116 for rotation.

Figure 22:
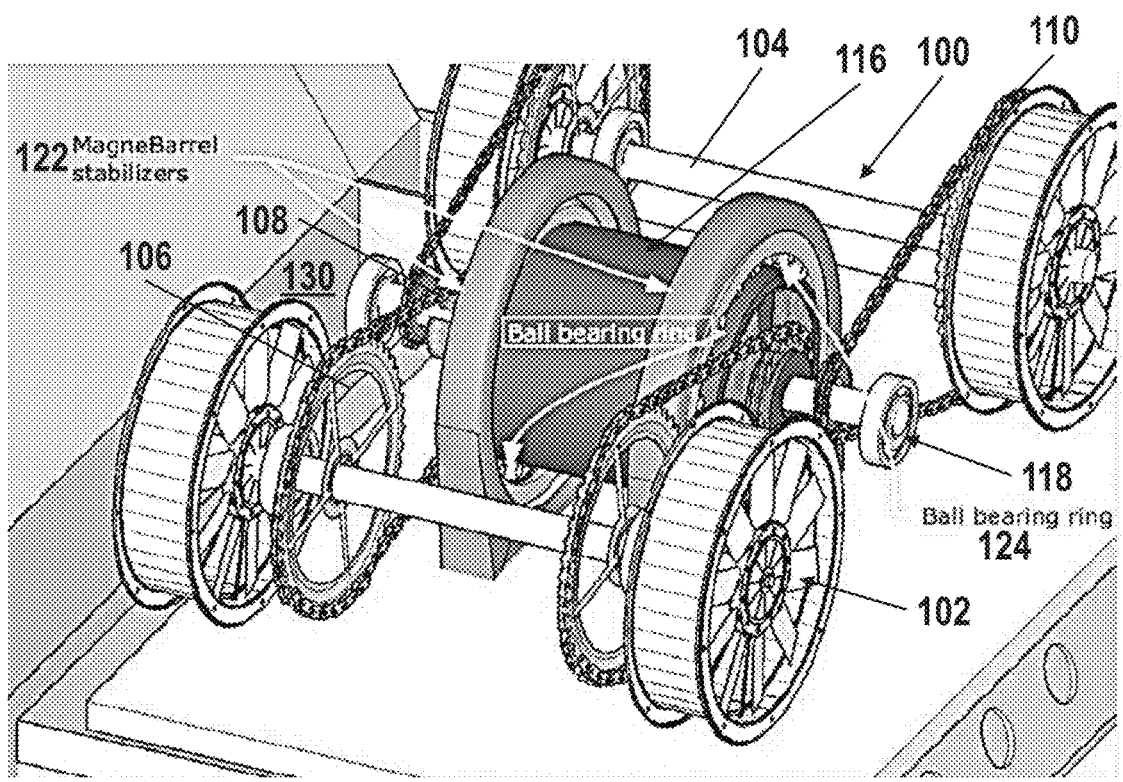
FIG. 22 is another top perspective view of the electrical generator system and the vehicle of FIG. 17.
Figure 23:
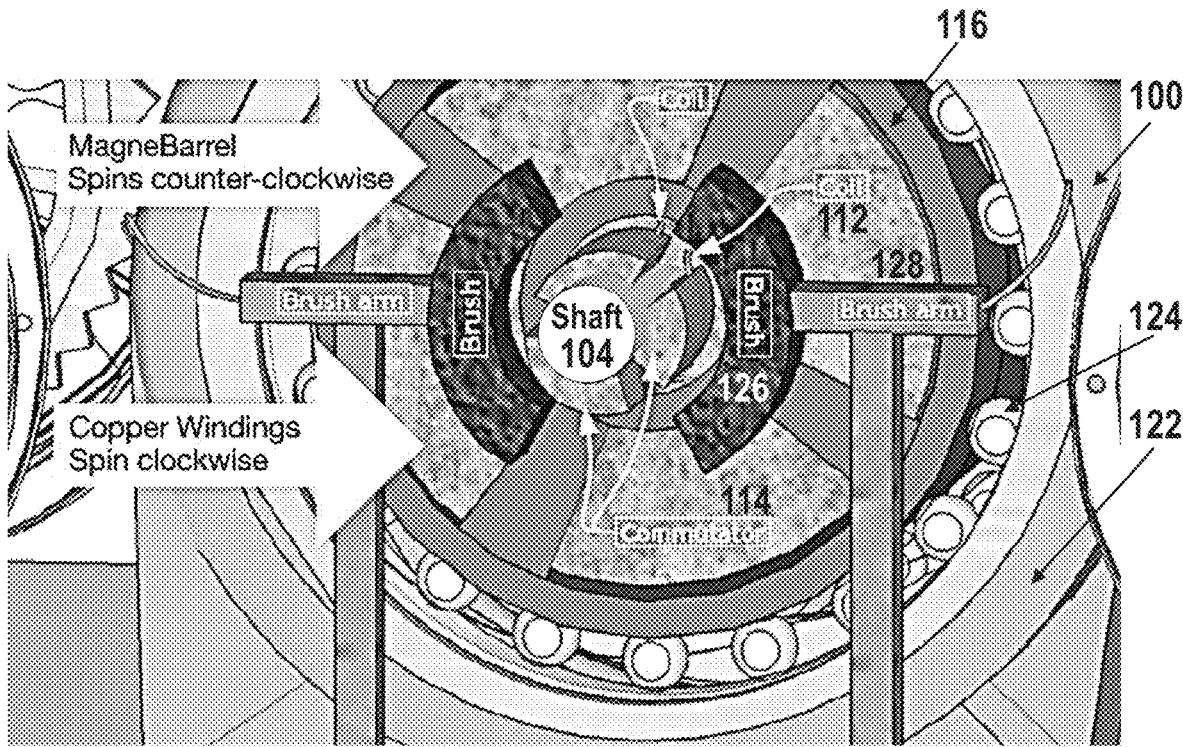
FIG. 23 is a rear perspective view of the electrical generator system and the vehicle of FIG. 17.
Figure 27:
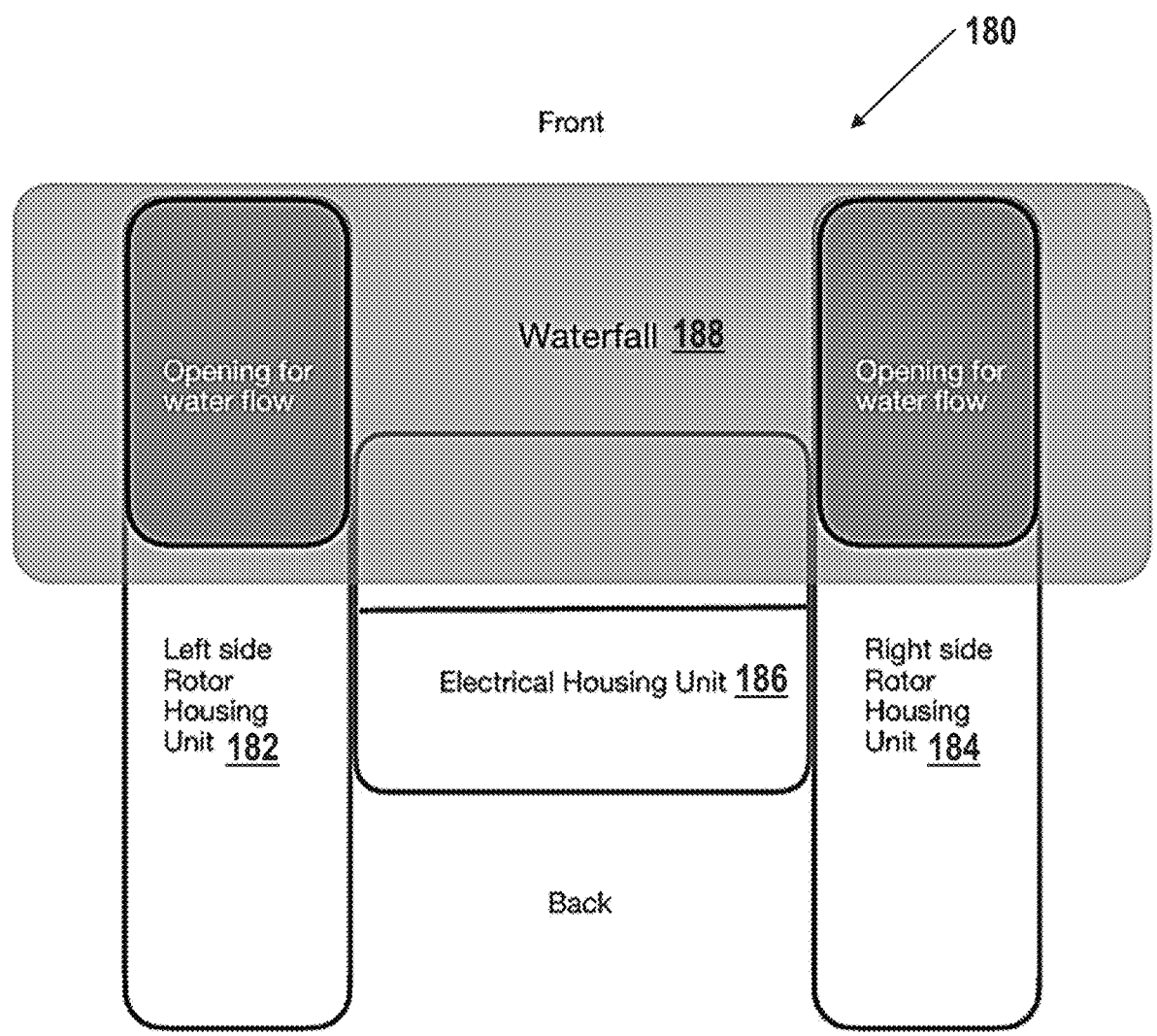
FIG. 27 is a top plan view of an electrical generator system according to another embodiment.

Referring now to FIG. 23, the commutator 114 is connected to the copper windings 112 and extends out through the magnet barrel 116 to brushes 126 on brush arms 128. The copper windings 112 and the commutator 114 are connected to the center shaft 104 to rotate clockwise. The center shaft 104 sits in the ball bearing ring 118 which is fixed to a back wall 130 (FIG. 22). The brush arms 128 are fixed to the vehicle.

The electrical generator system 100 is "statorless" because the magnetic elements of are not stationary. The magnetic elements are provided in the magnet barrel 116 to spin in the opposite direction of the copper windings 112. This statorless feature allows the generator 100 to be mobile. The statorless features also creates a generator system 100 with spinning at twice the speed of a stator system, thereby creating more power for the vehicle.

Multiple brush set commutators have two carbon brushes making an electrical connection at any given position. When the brushes are contacting at opposite sides, they are effectively connected to two parallel sets of twelves series of connected windings. In effect, almost every winding is active all the time. The only inactive windings at any given moment are those that are shorted by the brushes being in simultaneous contact with adjacent commutator bars.

Adding multiple brush sets to each commutator harnesses more electricity. The brushes could be embedded within a brush ring that surrounds the armature. Each set contains four brushes. One set is active while another set cools down and vice versa. One set could also be used as a back-up system. Brushes may also be added to every other copper slat on the commutator.

FIGS. 24-26 illustrate another electrical generator system 150 according to an embodiment. An upper rotor 152 contains copper elements 154 and spins counterclockwise. A lower rotor 156 contains magnetic elements 158 and spins clockwise. The electrical generator system 150 is designed to generate onboard electricity that can be used in real time by a power system of a vehicle. The electrical generator system 150 is driven by a flowing fluid. The electrical generator system 150 has two moving parts, the upper rotor 152 that holds the copper elements 154, and the bottom rotor 156 containing the magnetic elements 158.

The copper ring 154 is connected to the upper rotor 152 and spins within a cavity or corridor in the lower rotor 156, which is between two magnetic rings 158. The upper rotor 152 is axially supported upon a ball bearing assembly 160 on the lower rotor 156. The lower rotor is axially supported for rotation upon a ball bearing assembly 162 upon the vehicle.

The electrical generator system 150 can be placed in, or on top of, a vehicle. For example, the electrical generator system 150 can be provided in a rear end of a vehicle with airflow directed into sides of the vehicle and through the electrical generator system 150.

Figure 28:
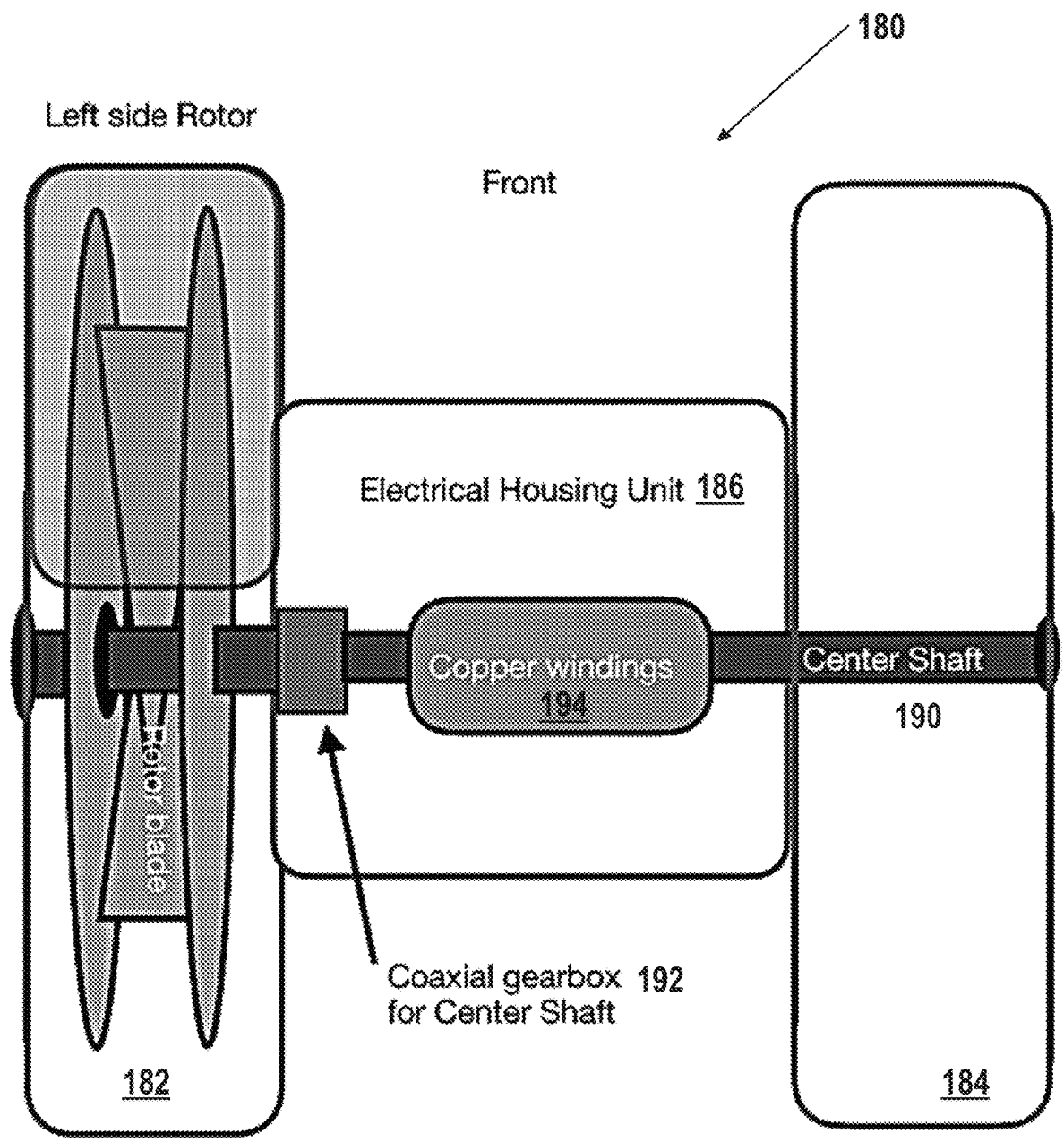
FIG. 28 is a top plan schematic view of the electrical generator system of FIG. 27.
Figure 29:
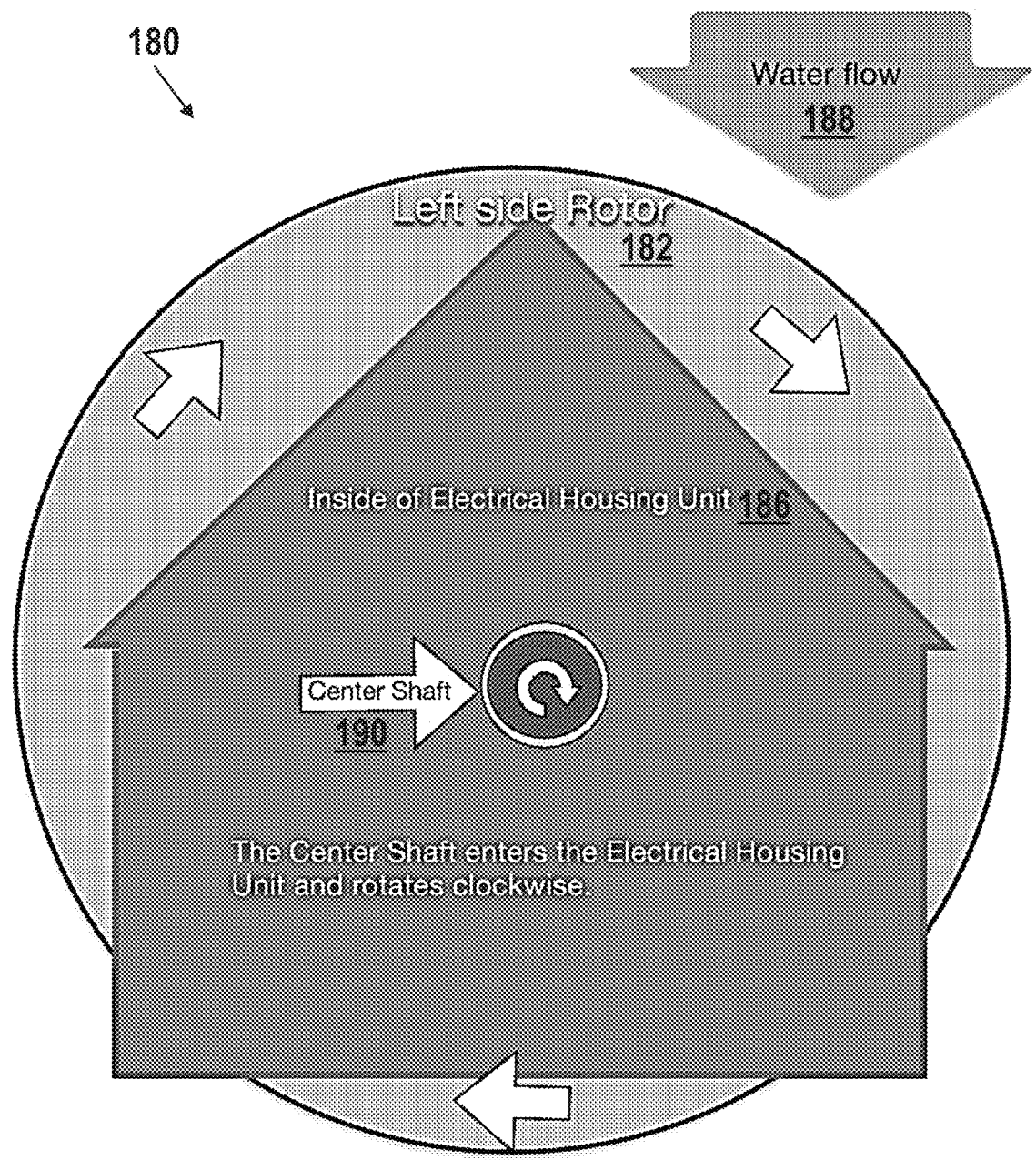
FIG. 29 is a right side section view of the electrical generator system of FIG. 27.

FIGS. 27-40 illustrate an electrical generator system 180 according to another embodiment. Two rotors 182, 184 situated on each side of an electrical housing unit 186 that is placed for access of the rotors 182, 184 to downward flowing water, such as a waterfall 188. The flowing water causes both rotors 182, 184 to rotate in the same rotary direction. As illustrated in FIGS. 28 and 29, the left side rotor 182 is attached to a center shaft 190. From inside the electrical housing unit 186, the left rotor 182 and the center shaft 190 rotate clockwise. The center shaft 190 enters the electrical housing unit 186 and attaches to a carrier bracket inside a coaxial gearbox 192. Copper windings 194 are provided upon the center shaft 190.

Figure 30:
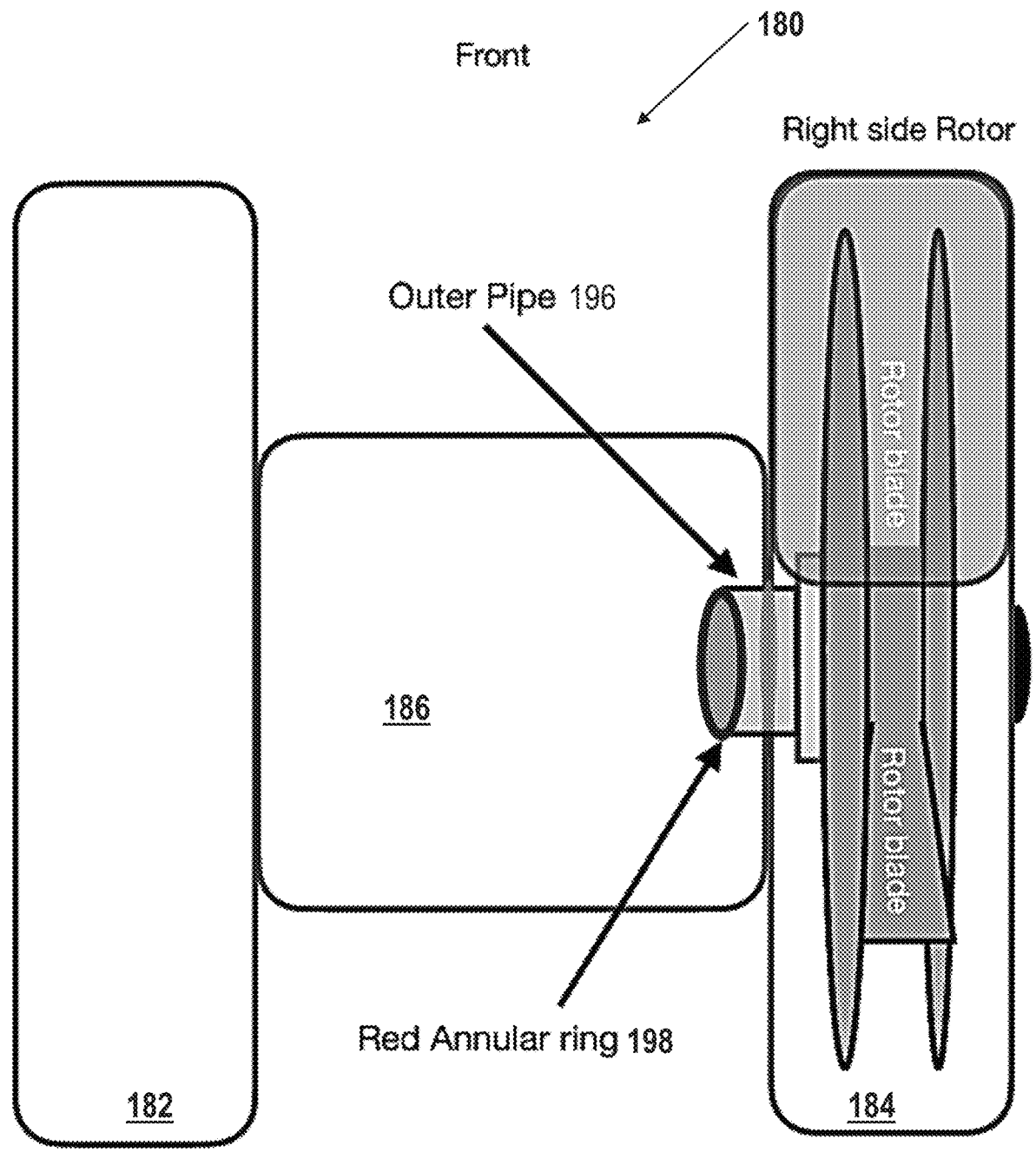
FIG. 30 is another top plan schematic view of the electrical generator system of FIG. 27.
Figure 31:
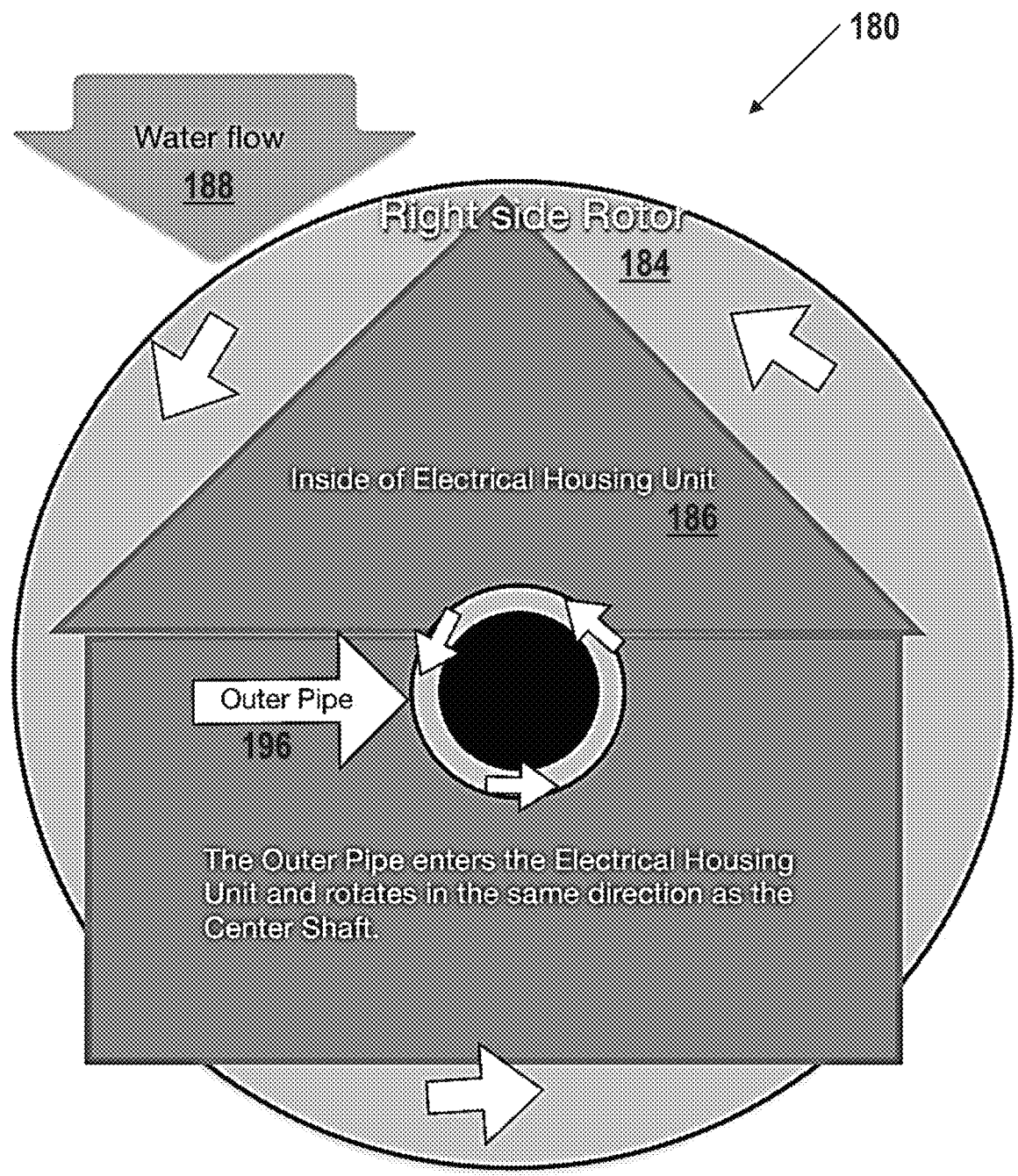
FIG. 31 is a left side section view of the electrical generator system of FIG. 27.
Figure 32:
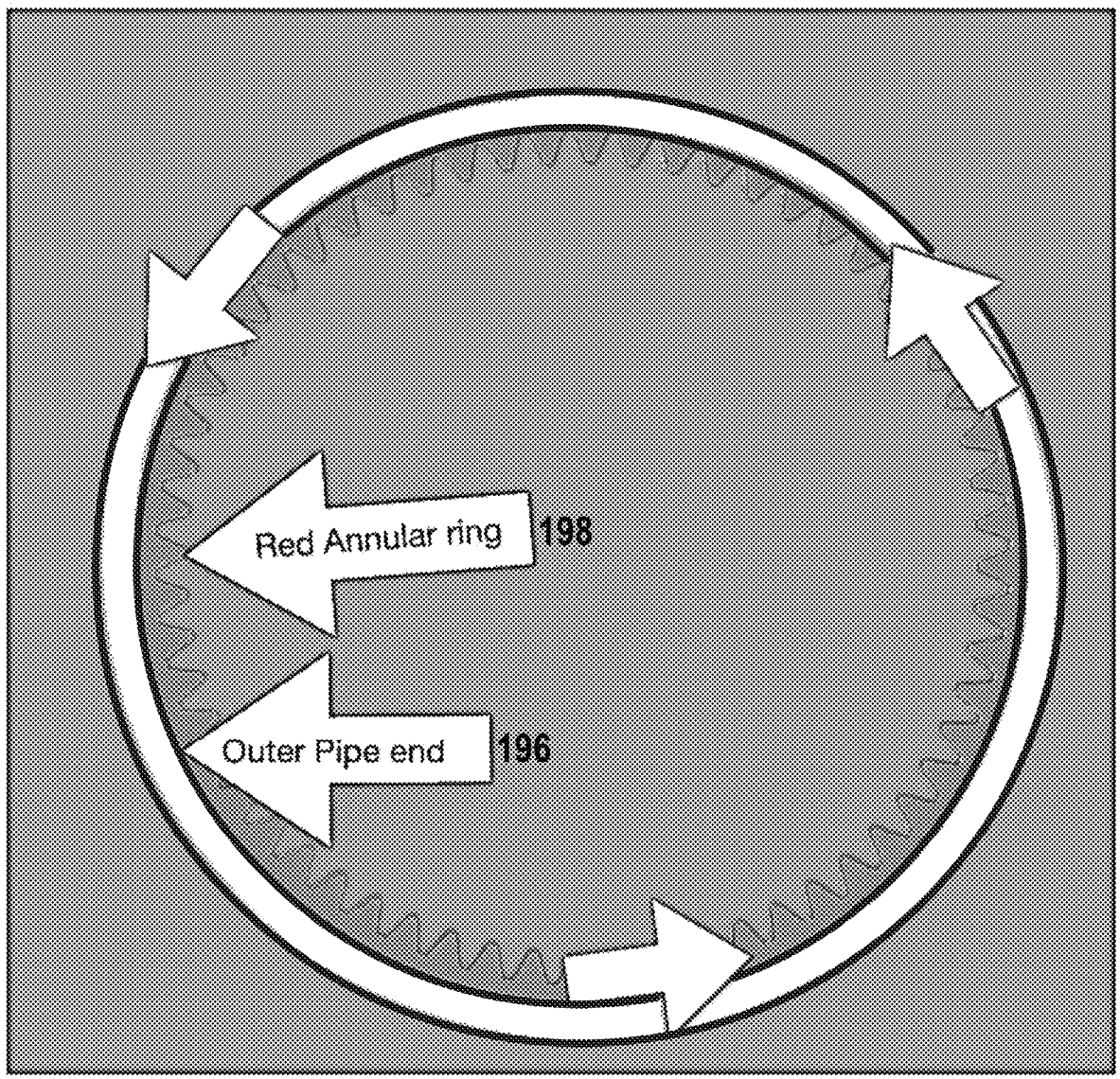
FIG. 32 is a partially disassembled axial end view of a transmission of the electrical generator system of FIG. 27.

Referring now to FIGS. 30-32, the right side rotor 184 is attached to an outer pipe 196. The outer pipe 196 enters the electrical housing unit 186. An annular internal ring gear 198 of an inline gearbox 200 is attached to an inside of the outer pipe 196.

Figure 33:
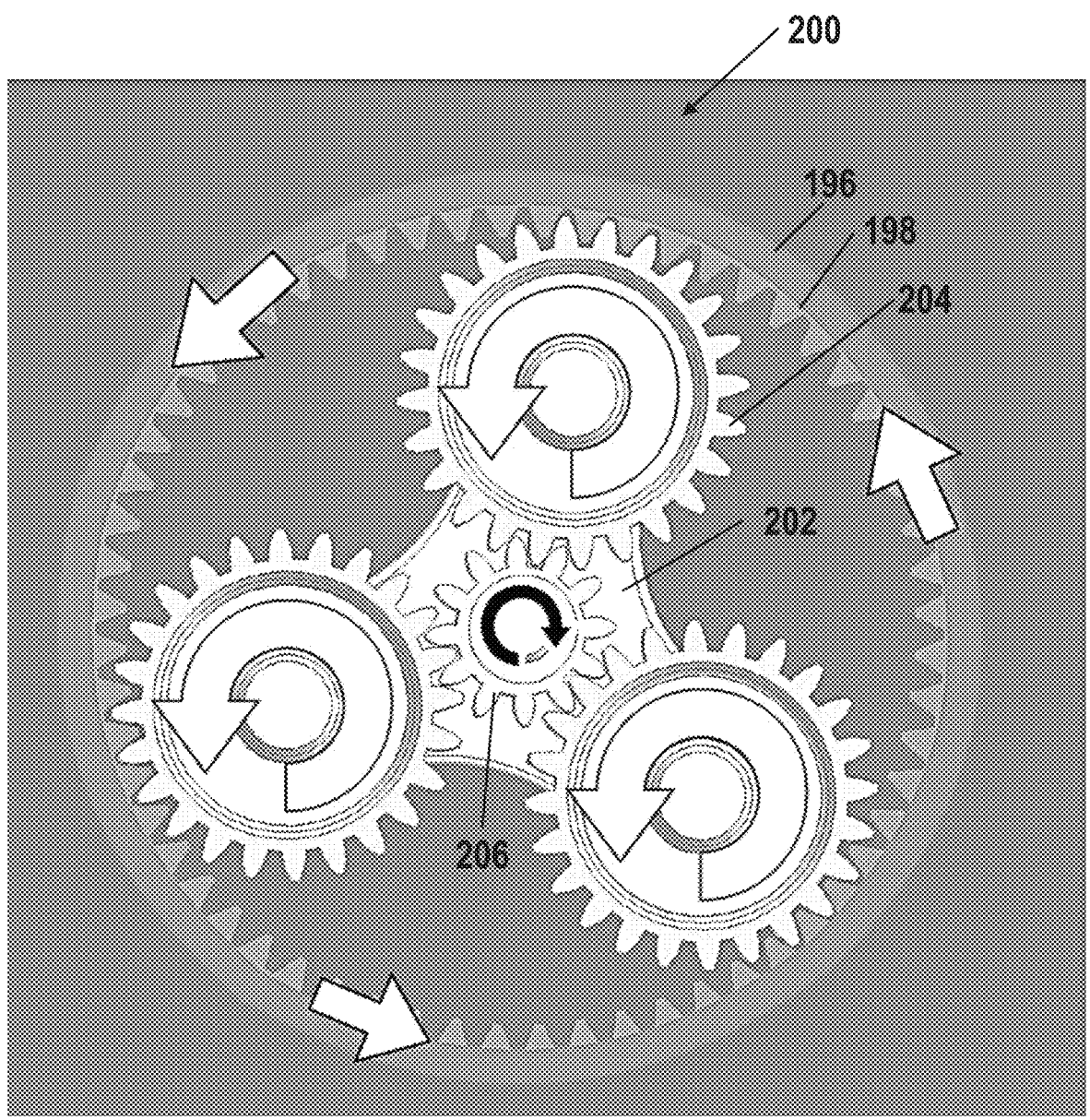
FIG. 33 is another partially disassembled axial end view of a transmission of the electrical generator system of FIG. 27.
Figure 34:
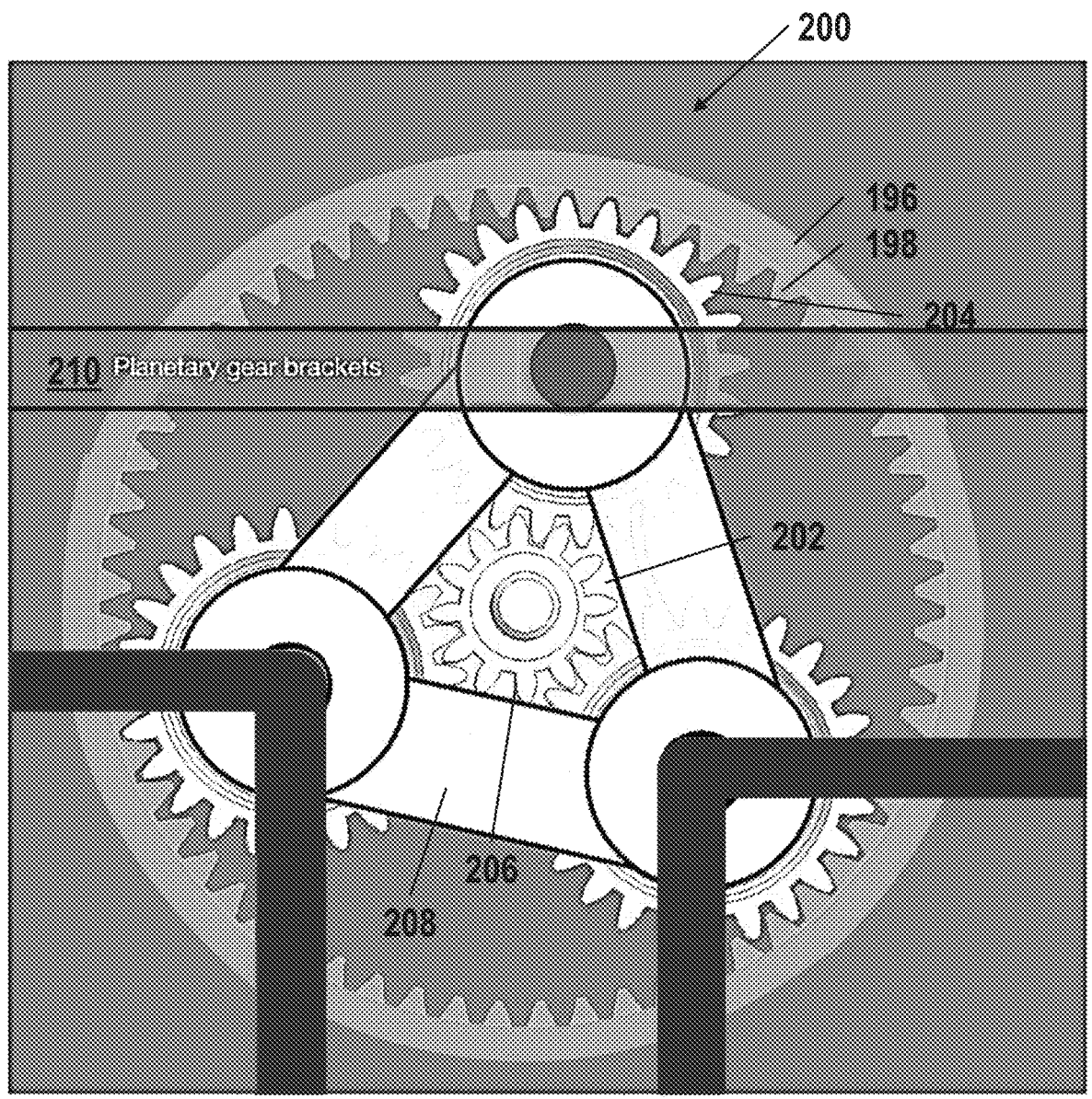
FIG. 34 is another partially disassembled axial end view of a transmission of the electrical generator system of FIG. 27.

With reference now to FIGS. 33 and 34, the inline gearbox 200 contains five gears and a carrier 202. Three planetary gears 204 are each supported for rotation upon the carrier bracket 202 in engagement with the ring gear 198. A sun gear 206 is engaged to, and driven by, the planetary gears 204. The outer pipe 196 with the annular ring gear 198 rotate counterclockwise. Rotation of the ring gear 198 causes the three planetary gears 204 to also rotate counterclockwise. The counterclockwise rotation of the three planetary gears 204 causes the center sun gear 206 to spin clockwise with a higher rotational speed. A stationary carrier bracket 208 allows the three planetary gears 204 to rotate instead of revolving. Brackets 210 secure the carrier bracket 208 to the electrical housing unit 186.

Figure 35:
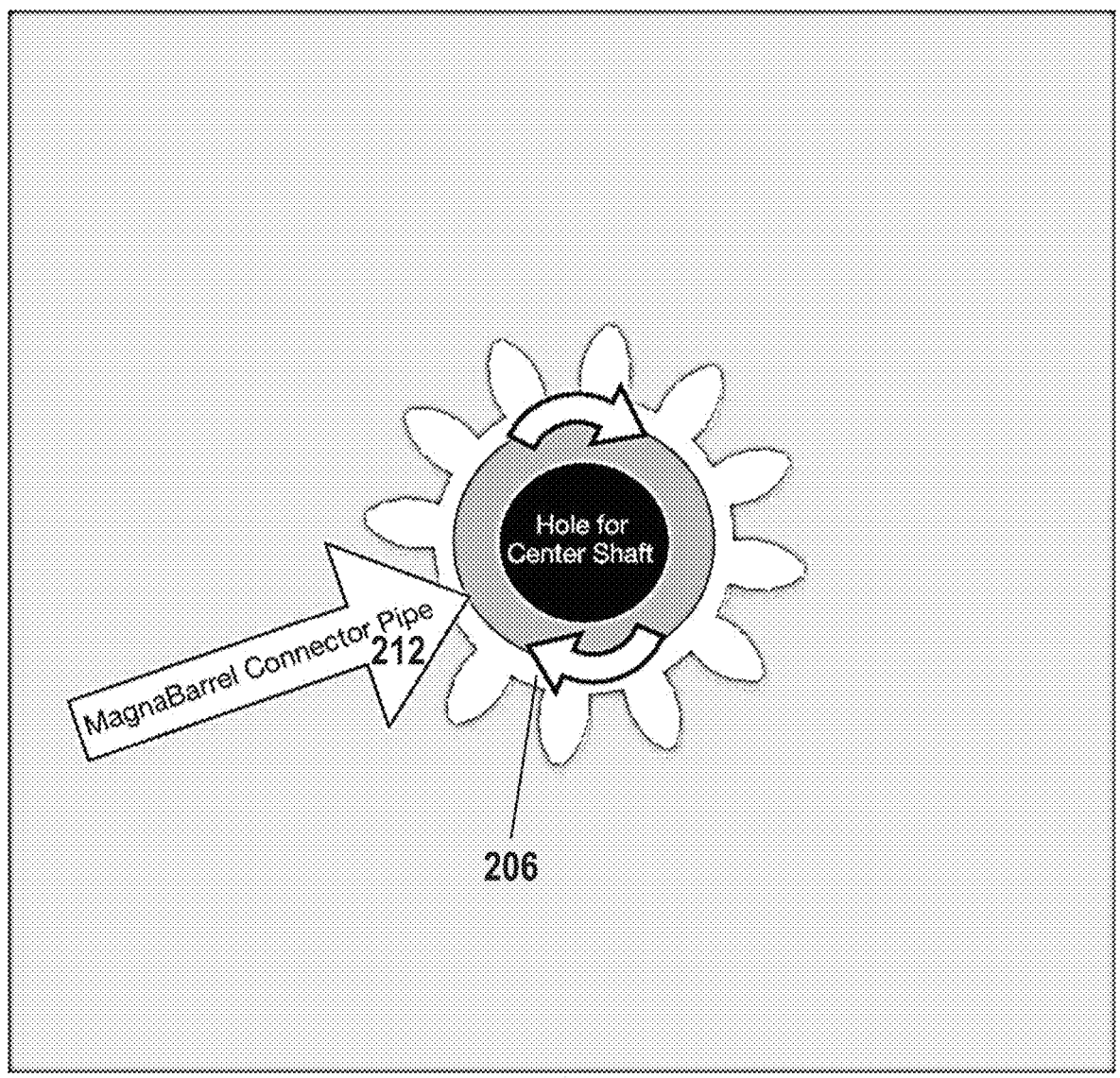
FIG. 35 is another partially disassembled axial end view of a transmission of the electrical generator system of FIG. 27.
Figure 36:
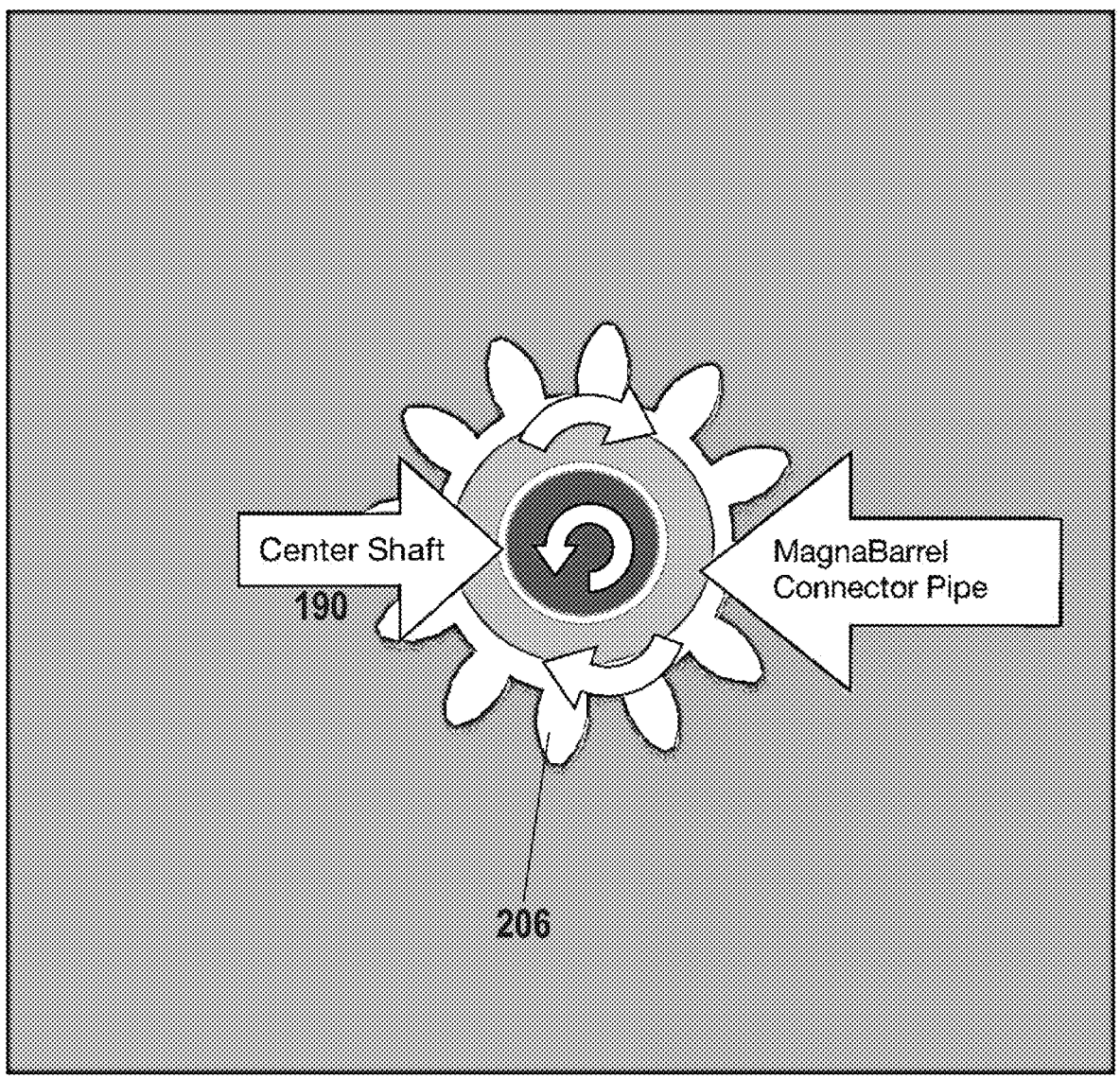
FIG. 36 is another partially disassembled axial end view of a transmission of the electrical generator system of FIG. 27.
Figure 37:
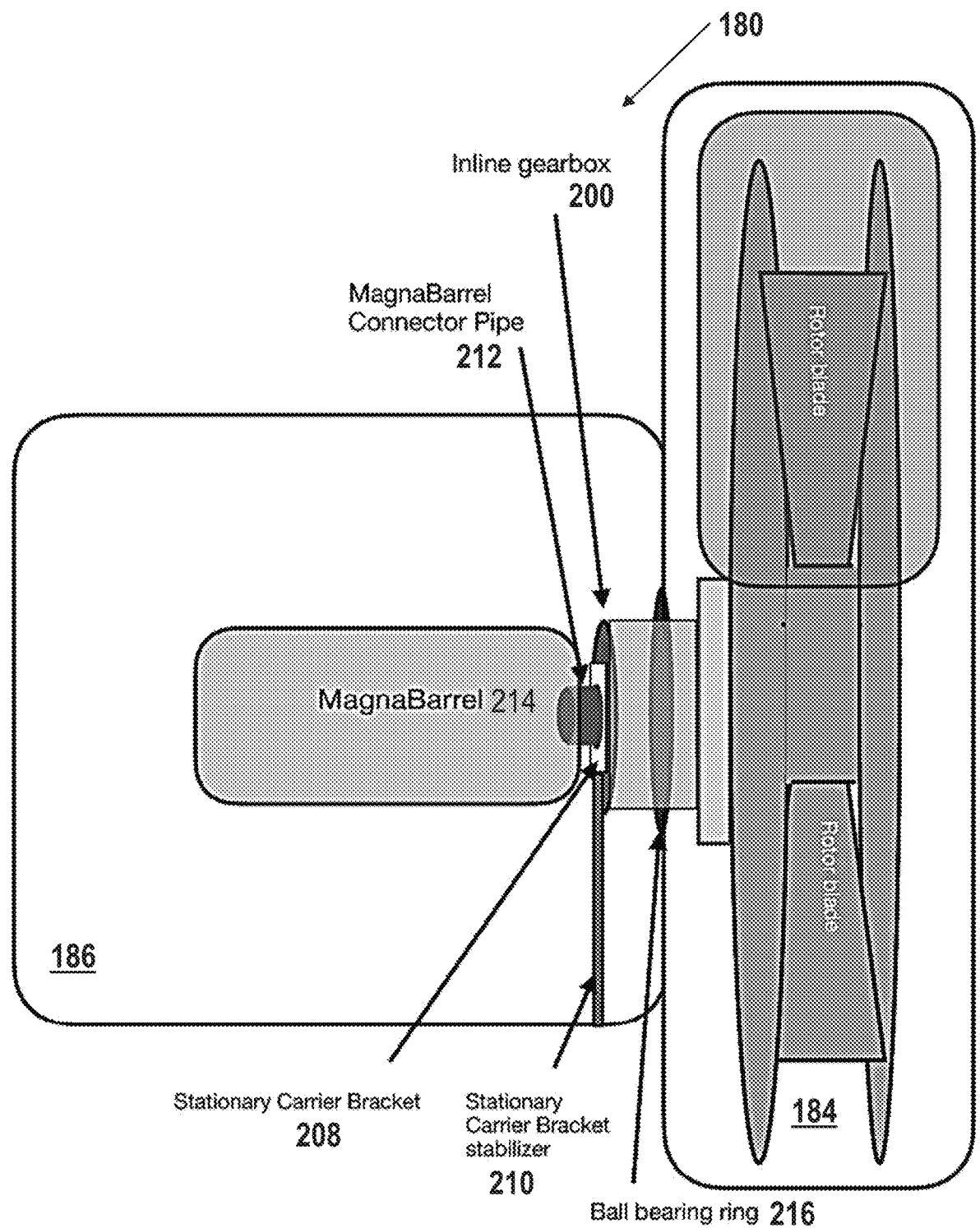
FIG. 37 is another top plan schematic view of the electrical generator system of FIG. 27.

FIGS. 35 and 36 illustrate a connector pipe 212 attached to the sun gear 206. FIGS. 35-38 illustrate the connector pipe 212 extends through the transmission and connects to a magnet barrel 214. Referring again to FIG. 35, the sun gear 206 and the pipe 212 rotate clockwise. FIG. 36 illustrates that the pipe 212 has clearance for the counter-rotating center shaft 190 to be received within the pipe 212. FIG. 37 illustrates that a ball bearing assembly 216 supports the inline gearbox 200.

Figure 38:
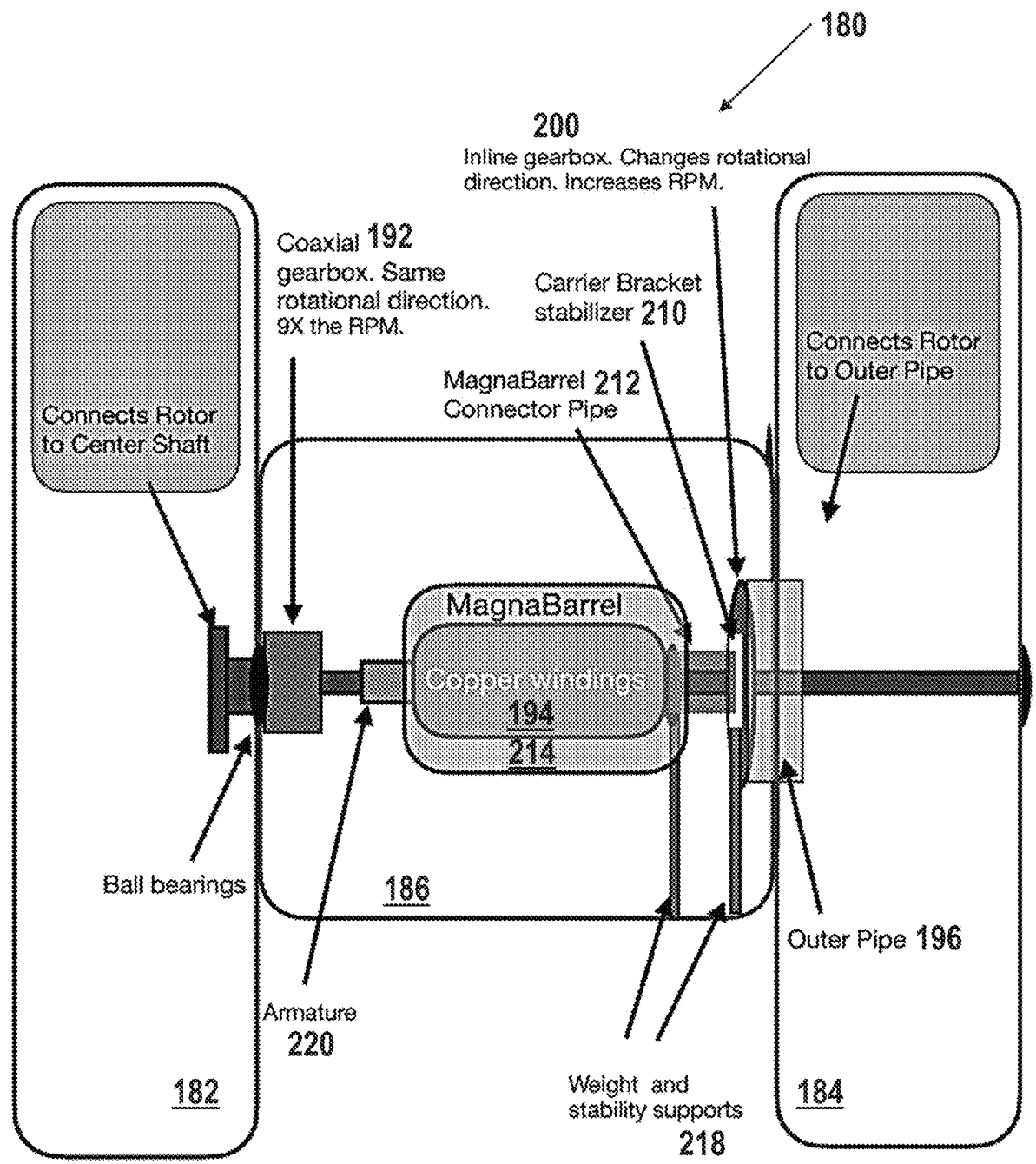
FIG. 38 is another top plan schematic view of the electrical generator system of FIG. 27.

Referring to FIG. 38, the inline gearbox 200 causes the pipe 212 and the magnet barrel 214 to spin in an opposite rotary direction of the copper windings 194 to create a statorless electrical generator system 180. Stability supports 218 support the magnet barrel 214 and the pipe 212 within the electrical housing unit 186.

Figure 39:
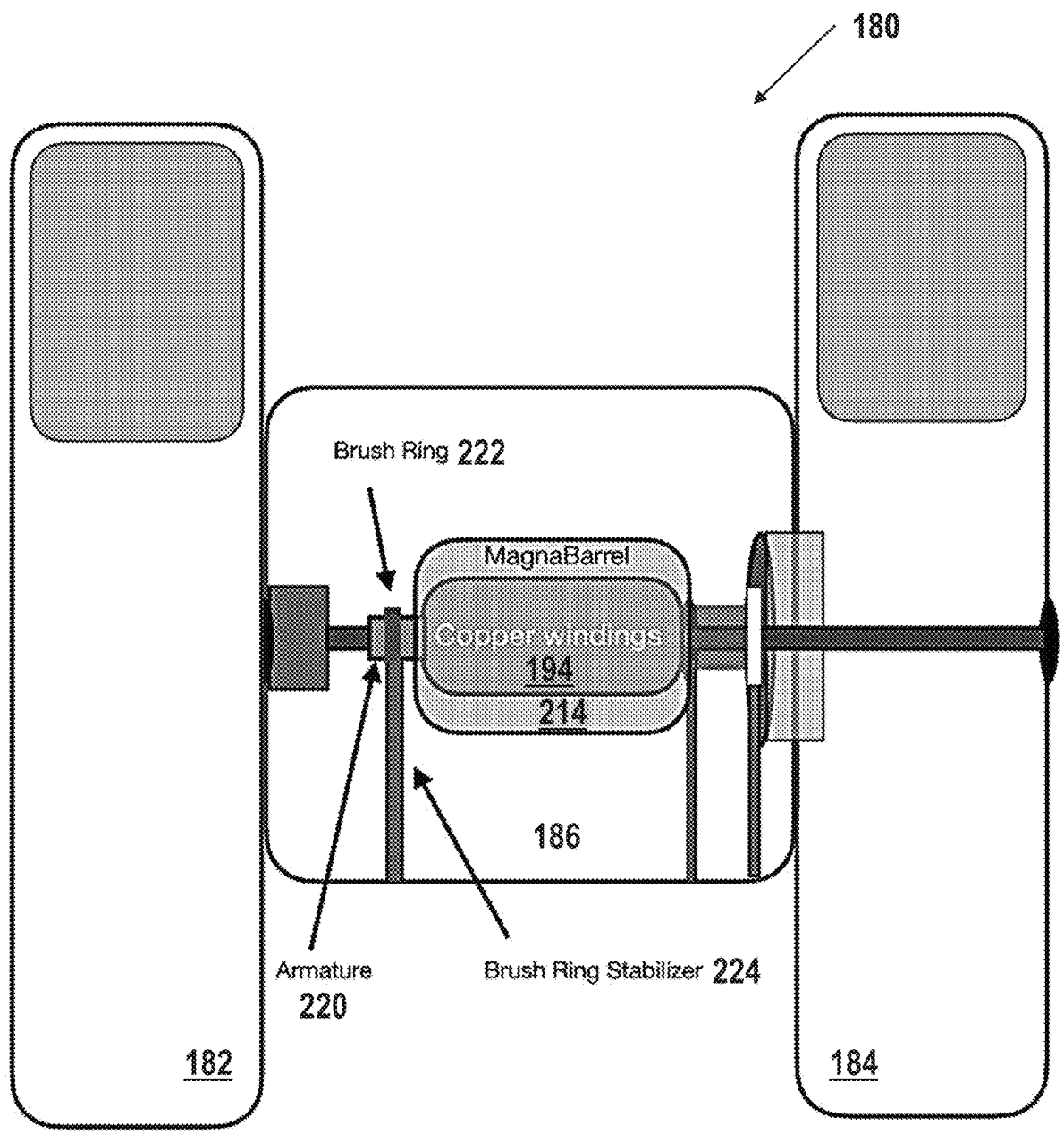
FIG. 39 is another top plan schematic view of the electrical generator system of FIG. 27.
Figure 40:
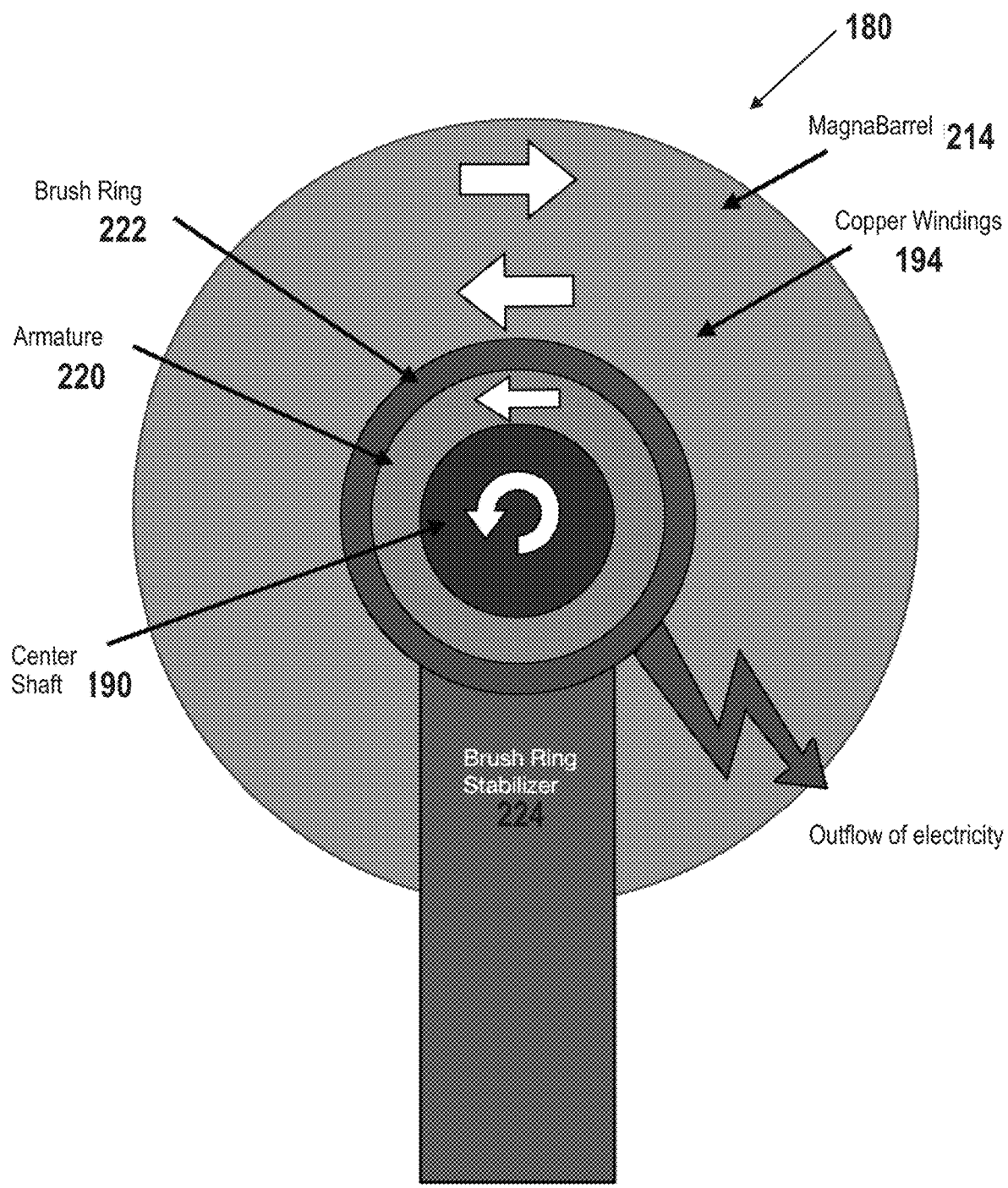
FIG. 40 is a right side schematic view of the electrical generator system of FIG. 27.

FIGS. 38-40 illustrate an armature 220 connected to the copper windings 194. FIGS. 39 and 40 illustrate a brush ring 222 connected to and surrounding the armature 220. The brush ring 222 is supported by a stabilizer 224. As the armature 220 rotates, electricity that is produced by the counter-rotating conductor windings 194 and the magnet barrel 214 is conveyed from the armature 220 to the brush ring 222.

The present invention is not limited in its application to the details of construction and to the dispositions of the components set forth in the foregoing description or illustrated in the appended drawings in association with the present illustrative embodiments of the invention. The present invention is capable of other embodiments and of being practiced and carried out in various ways. In addition, it is to be understood that the phraseology and terminology employed herein are for the purposes of illustration and example, and should not be regarded as limiting. As such, those skilled in the art will appreciate that the concepts, upon which this disclosure is based, may readily be utilized as a basis for the designing of other structures, methods and systems for carrying out the several purposes of the present invention. It is important, therefore, that the scope of the claims appended hereto be regarded—interpreted as including such equivalent constructions.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical generator system comprising:
   a housing;
   a first rotor on the housing for rotation relative to the housing in response to fluid flow through the first rotor;
   a second rotor on the housing for rotation relative to the housing in response to fluid flow through the second rotor;
   the first rotor and the second rotor being spaced apart from one another;
   a first armature driven for rotation by the first rotor for rotation in a first rotary direction; and
   a second armature oriented coaxial with the first armature and driven for rotation by the second rotor for rotation in a second rotary direction that is opposite to the first rotary direction to generate electricity;
   the first armature including a magnetic component driven to rotate by the first rotor, the magnetic component being oriented between the first rotor and the second rotor, the magnet component comprising an inner magnetic ring and an outer magnetic ring, the inner and outer magnetic rings being spaced from one another in a co-planar and concentric orientation forming an annular corridor cavity therebetween;
   the second armature including a copper component driven to rotate by the second rotor, the copper component being oriented between the first rotor and the second rotor coaxial with the magnetic component, the copper component comprising an annular copper ring disposed in the corridor cavity and spaced apart from the inner and outer magnetic rings.

2. The electrical generator system of claim 1 wherein the first rotor and the second rotor are each independently driven for counter-rotation.

3. The electrical generator system of claim 1 wherein the magnetic component is oriented on the first rotor facing the second rotor; and wherein the copper component is oriented on the second rotor facing the first rotor.

4. The electrical generator system of claim 1 further comprising:
   a first timing belt or chain connecting the first rotor and the magnetic component such that rotation of the first rotor rotates the magnetic component; and
   a second timing belt or chain connecting the second rotor and the copper component such that rotation of the second rotor rotates the copper component.

5. The electrical generator system of claim 1 wherein each rotor is a water impeller.

6. The electrical generator system of claim 1 wherein each rotor is an air impeller.

7. The electrical generator system of claim 1 wherein the housing is adapted to be installed upon a vehicle.

8. The electrical generator system of claim 7 wherein the housing is adapted to be installed upon a roof of the vehicle.

9. The electrical generator system of claim 1 wherein the housing is adapted to be installed in a body of water.

10. The electrical generator system of claim 1 wherein the housing is adapted to be installed in a pipe.

11. A method of generating electricity comprising placing the electrical generator system of claim 1 within the fluid flow.

12. A method of generating electricity comprising installing the electrical generator system of claim 1 on a vehicle within a direction of fluid travel.

13. An electrical generator system comprising:
- a housing;
- a first rotor on the housing for rotation relative to the housing in response to fluid flow through the first rotor;
- a second rotor on the housing for rotation relative to the housing in response to fluid flow through the second rotor;
- a magnetic component driven for rotation by the first rotor for rotation in a first rotary direction, the magnet component comprising an annular inner magnetic ring and an outer magnetic ring, the inner and outer magnetic rings being spaced from one another in a co-planar and concentric orientation forming an annular corridor cavity therebetween; and
- a copper component oriented coaxial with the magnetic component and driven for rotation by the second rotor for rotation in a second rotary direction that is opposite to the first rotary direction to generate electricity, the copper component comprising an annular copper ring disposed in the corridor cavity and spaced apart from the inner and outer magnetic rings.

14. An electrical generator system comprising:
- a housing;
- a first rotor on the housing for rotation relative to the housing in response to fluid flow through the first rotor;
- a second rotor on the housing coaxial with the first rotor for rotation relative to the housing in response to fluid flow through the second rotor;
- a magnetic component oriented on the first rotor facing the second rotor, the magnet component comprising an annular inner magnetic ring and an outer magnetic ring, the inner and outer magnetic rings being spaced from one another in a co-planar and concentric orientation forming an annular corridor cavity therebetween, the magnetic component driven for rotation by the first rotor for rotation in a first rotary direction; and
- a copper component oriented on the second rotor facing the magnetic component, coaxial with the magnetic component, the copper component comprising an annular copper ring disposed in the corridor cavity and spaced apart from the inner and outer magnetic rings, the copper component driven for rotation by the second rotor for rotation in a second rotary direction that is opposite to the first rotary direction to generate electricity.

* * * * *